(12) United States Patent
Miyashita

(10) Patent No.: US 12,450,371 B2
(45) Date of Patent: Oct. 21, 2025

(54) INFORMATION PROCESSING METHOD, INFORMATION PROCESSING APPARATUS, AND NON-TRANSITORY COMPUTER-READABLE STORAGE MEDIUM

(71) Applicant: Axelspace Corporation, Tokyo (JP)

(72) Inventor: Naoki Miyashita, Tokyo (JP)

(73) Assignee: Axelspace Corporation, Tokyo (JP)

( * ) Notice: Subject to any disclaimer, the term of this patent is extended or adjusted under 35 U.S.C. 154(b) by 0 days.

(21) Appl. No.: 18/899,726

(22) Filed: Sep. 27, 2024

(65) Prior Publication Data
US 2025/0021673 A1   Jan. 16, 2025

Related U.S. Application Data

(63) Continuation of application No. PCT/JP2023/013049, filed on Mar. 30, 2023.

(30) Foreign Application Priority Data

Mar. 30, 2022 (JP) ................. 2022-057260

(51) Int. Cl.
*G06F 21/60* (2013.01)
*G06F 21/71* (2013.01)
*H04B 7/185* (2006.01)

(52) U.S. Cl.
CPC .......... *G06F 21/604* (2013.01); *G06F 21/602* (2013.01); *G06F 21/71* (2013.01); *H04B 7/1858* (2013.01)

(58) Field of Classification Search
CPC ...... G06F 21/604; G06F 21/602; G06F 21/71; G06F 21/64; H04B 7/1858; G06Q 20/065;
(Continued)

(56) References Cited

U.S. PATENT DOCUMENTS

2020/0296114 A1* 9/2020 Metzger ............... B64G 1/1085
2022/0327820 A1* 10/2022 Kurahara ............... G06V 20/13
(Continued)

FOREIGN PATENT DOCUMENTS

CN   114024594 A   2/2022
JP   S62-82742 A   4/1987
(Continued)

OTHER PUBLICATIONS

Yarlagadda, Sri Kalyan, et al. "Satellite image forgery detection and localization using gan and one-class classifier." arXiv preprint arXiv:1802.04881 (2018). (Year: 2018).*
(Continued)

*Primary Examiner* — Sangseok Park
(74) *Attorney, Agent, or Firm* — Christian S. Hans; Bret E. Field; Bozicevic, Field & Francis LLP

(57) ABSTRACT

An information processing method according to one aspect executes processing of: acquiring satellite data regarding a satellite; performing anti-tampering processing on the acquired satellite data; and outputting satellite data obtained after the anti-tampering processing on the satellite data. In addition, preferably, processing of acquiring a satellite image captured by the satellite, performing anti-tampering processing on the acquired satellite image, and outputting a satellite image obtained after the anti-tampering processing on the satellite image is executed.

19 Claims, 23 Drawing Sheets

(58) Field of Classification Search
CPC ... G06Q 20/102; G06Q 30/0185; G06Q 30/06
See application file for complete search history.

(56) References Cited

U.S. PATENT DOCUMENTS

| | | | | |
|---|---|---|---|---|
| 2022/0405413 | A1* | 12/2022 | Yokoyama | G06F 21/64 |
| 2023/0222248 | A1* | 7/2023 | Altaf | G06F 21/64 |
| | | | | 713/193 |
| 2024/0354851 | A1* | 10/2024 | Stolt | G06Q 50/02 |

FOREIGN PATENT DOCUMENTS

| | | | |
|---|---|---|---|
| JP | 2004-304723 | A | 10/2004 |
| JP | 2011-13936 | A | 1/2011 |
| JP | 2020-108023 | A | 7/2020 |
| JP | 2021-86172 | A | 6/2021 |
| JP | 2022-13271 | A | 1/2022 |
| JP | 7043672 | B1 | 3/2022 |

OTHER PUBLICATIONS

Miyazaki et al., COCO—Location and time verification information service, Systems/Control/Information, 50 (4): 158-161, Apr. 15, 2006, with machine translation.
English Translation of International Search Report for PCT Application No. PCT/JP2023/013049 mailed Jun. 13, 2023.
Togashi et al., Location and time verification information service, Correct Coordinate and Date Stamp Service, Aug. 25, 2005, with machine translation.

* cited by examiner

| Satellite data ID | Type | Satellite data | Hash value | Satellite ID |
|---|---|---|---|---|
| S-0001 | Satellite image | *** | *** | 0001 |
| S-0002 | Satellite image | *** | *** | 0001 |
| S-0003 | Behavior data | *** | *** | 0001 |
| S-0004 | Command data | *** | *** | 0001 |

FIG.11

| Observation data ID | Observation data | Hash value | Satellite ID | Observation date and time |
|---|---|---|---|---|
| O-0001 | *** | *** | 0001 | February 2022 |
| O-0002 | *** | *** | 0002 | *** |

| Satellite data ID | Type | Satellite data | Hash value | Satellite ID | Satellite image | Satellite image NFT | Serial number |
|---|---|---|---|---|---|---|---|
| S-0001 | Satellite image | *** | *** | 0001 | *** | *** | *** |
| S-0002 | Satellite image | *** | *** | 0001 | *** | *** | *** |
| S-0003 | Behavior data | *** | *** | 0001 | - | - | - |
| S-0004 | Command data | *** | *** | 0001 | - | - | - |

| Satellite data ID | Satellite image | | | Behavior data | Command data |
|---|---|---|---|---|---|
| | Image ID | Date and time | Image data | | |
| S-0001 | I001 | 2022/03/15 0:00 | I001.jpg | Imaging position:*** Posture:*** ··· | *** |
| | I002 | 2022/03/15 0:15 | I002.jpg | *** | |
| | I003 | 2022/03/15 0:30 | I003.jpg | *** | |

171

| Observation data | Hash value | Satellite ID | Combination data NFT | Serial number |
|---|---|---|---|---|
| Latitude:*** Longitude:*** Carbon dioxide concentration:*** | *** | 0001 | *** | *** |
| *** | | | | |
| *** | | | | |

INFORMATION PROCESSING METHOD, INFORMATION PROCESSING APPARATUS, AND NON-TRANSITORY COMPUTER-READABLE STORAGE MEDIUM

CROSS-REFERENCE TO RELATED APPLICATIONS

This application is a continuation application of PCT International Application No. PCT/JP2023/013049 which has international filing date of Mar. 30, 2023 and designated the United States of America, and claiming priority to Patent Application No. 2022-057260 filed in Japan on Mar. 30, 2022.

BACKGROUND ART

In recent years, technology related to satellite images has become widespread. Japanese Patent Laid-Open Publication No. 2021-086172 discloses a satellite image correction method in which the position of a reference point for comparison on a satellite image created by an artificial satellite is identified and the satellite image is corrected based on the identified position information.

DESCRIPTION

However, the invention of Japanese Patent Laid-Open Publication No. 2021-086172 has a problem that it is not possible to prevent tampering with satellite data (for example, satellite images).

In one aspect, an object thereof is to provide an information processing method and the like capable of performing anti-tampering processing on satellite data.

An information processing method according to one aspect executes processing of: acquiring satellite data regarding a satellite; performing anti-tampering processing on the acquired satellite data; and outputting satellite data obtained after the anti-tampering processing on the satellite data.

In one aspect, it is possible to perform anti-tampering processing on satellite data.

The above and further objects and features will more fully be apparent from the following detailed description with accompanying drawings.

FIG. 3 is an explanatory diagram showing an example of the record layout of a satellite data DB.

FIG. 11 is an explanatory diagram showing an example of the record layout of an observation data DB.

FIG. 16 is an explanatory diagram showing an example of the record layout of a satellite data DB in Embodiment 3.

FIG. 22 is an explanatory diagram showing an example of the record layout of a satellite data DB in Embodiment 4.

Hereinafter, the present invention will be described in detail with reference to the diagrams showing embodiments thereof.

EMBODIMENT 1

Figure 1:
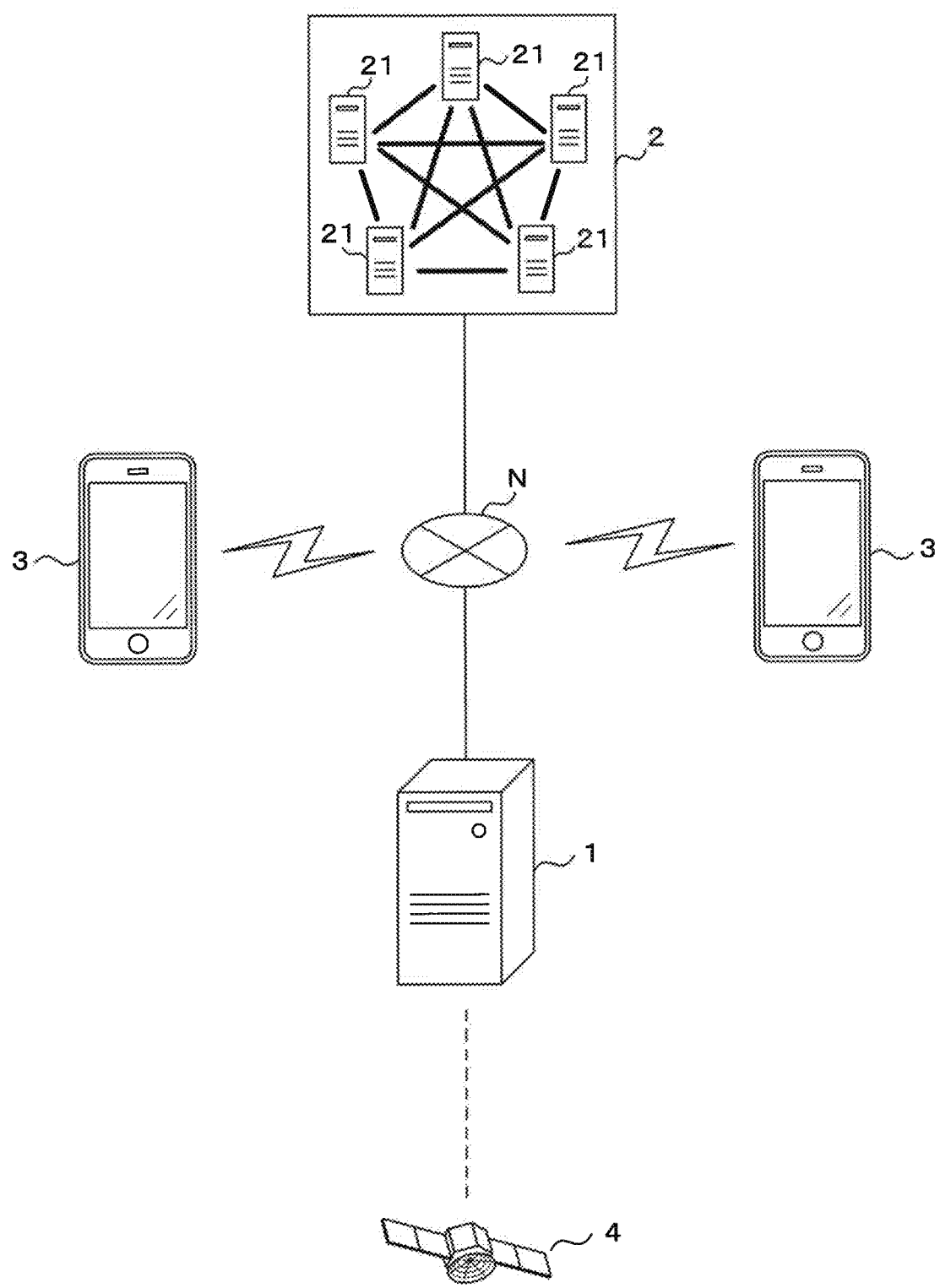
FIG. 1 is an explanatory diagram showing an overview of a satellite data tampering prevention system.

Embodiment 1 relates to a form in which anti-tampering processing is performed on satellite data regarding a satellite and satellite data after the anti-tampering processing is output. FIG. 1 is an explanatory diagram showing an overview of a satellite data tampering prevention system. The system according to the present embodiment includes an information processing apparatus 1, a blockchain system 2, an information processing terminal 3, and a satellite 4, and each apparatus transmits and receives information through a network N, such as the Internet.

The information processing apparatus 1 is an information processing apparatus that processes, stores, and transmits and receives various kinds of information. The information processing apparatus 1 is, for example, a server apparatus, a personal computer, or a general-purpose tablet PC (personal computer). In the present embodiment, the information processing apparatus 1 is assumed to be a server apparatus, and will be read as a server 1 below for the sake of simplicity.

The blockchain system 2 is a distributed ledger technology or a distributed network. The blockchain system 2 is configured by a plurality of nodes 21 that perform consensus processing. Each of the nodes 21 holds a copy of blockchain data through the execution of such consensus processing.

The blockchain system 2 generates a unit of data called a block at predetermined intervals, and stores data by linking blocks like a chain.

The blockchain system 2 is autonomously managed through the use of a peer-to-peer network and a distributed timestamp server. Since the data is stored in a chain form, once the data in the block is stored, it is difficult to retroactively change the data. The blockchain system 2 may be of public type, private type, or consortium type. The unit of data may be an individual transaction instead of a block. In addition, the data may be stored in a storage format, such as a directed acyclic graph, other than the chain form. Hereinafter, the blockchain system 2 will be read as a blockchain 2 for the sake of simplicity.

The information processing terminal 3 is a terminal device that receives and displays satellite data after anti-tampering processing, transmits an authentication request for the satellite data, and receives and displays the authentication result. The information processing terminal 3 is, for example, an information processing apparatus, such as a smart phone, a mobile phone, a wearable device such as Apple Watch (registered trademark), a tablet, or a personal computer terminal. Hereinafter, the information processing terminal 3 will be read as a user terminal 3 for the sake of simplicity.

The satellite 4 is a spacecraft including an artificial satellite, a space probe, a space plane, a UAS (Unmanned Aircraft System), a UAF (Unmanned Aviation Fundamentals), and the like.

The server 1 according to the present embodiment acquires satellite data regarding the satellite 4, and performs anti-tampering processing on the acquired satellite data. The server 1 outputs satellite data after the anti-tampering processing on the satellite data to the user terminal 3. In addition, when an authentication request for the satellite data is received from the user terminal 3, the server 1 performs authentication processing for the satellite data. The server 1 outputs the authentication result to the user terminal 3.

Figure 2:
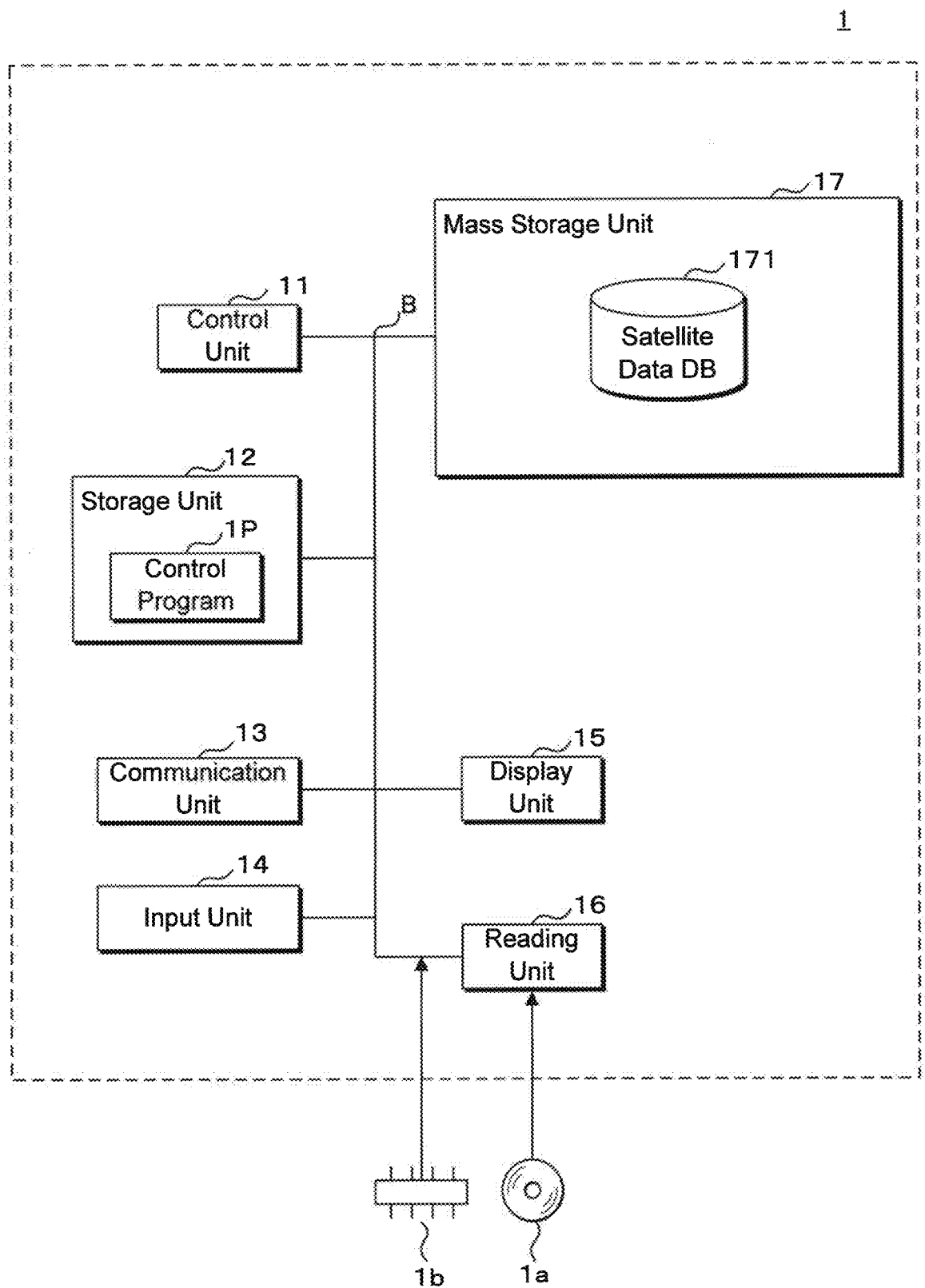
FIG. 2 is a block diagram showing an example of the configuration of a server.

FIG. 2 is a block diagram showing an example of the configuration of the server 1. The server 1 includes a control unit 11, a storage unit 12, a communication unit 13, an input unit 14, a display unit 15, a reading unit 16 and a mass storage unit 17. The respective components are connected to each other by a bus B.

The control unit 11 includes an arithmetic processing unit such as a CPU (Central Processing Unit), an MPU (Micro-Processing Unit), and a GPU (Graphics Processing Unit), and performs various kinds of information processing, control processing, and the like related to the server 1 by reading and executing a control program 1P (program product) stored in the storage unit 12. In addition, examples of the control program 1P include programs for generation and execution of a smart contract such as Geth (Go-Ethereum) and Mist Wallet of Ethereum, remittance of cryptocurrency, creation of accounts, and mining.

In addition, the control program 1P can be loaded so as to run on a single computer, or can be loaded so as to run on a plurality of computers interconnected by a communication network in a state of being distributed at one site or a plurality of sites. In addition, although the control unit 11 is described as a single processor in FIG. 2, the control unit 11 may be a multiprocessor.

The storage unit 12 includes memory elements such as a RAM (Random Access Memory) and a ROM (Read Only Memory), and stores the control program 1P, data, and the like necessary for the control unit 11 to perform processing. In addition, the storage unit 12 temporarily stores data and the like necessary for the control unit 11 to perform arithmetic processing. The communication unit 13 is a communication module for performing processing related to communication, and transmits and receives information to and from the node 21 of the blockchain 2, the user terminal 3, the satellite 4, and the like through the network N.

The input unit 14 is an input device such as a mouse, a keyboard, a touch panel, or a button, and outputs received operation information to the control unit 11. The display unit 15 is a liquid crystal display, an organic EL (electroluminescence) display, or the like, and displays various kinds of information according to instructions from the control unit 11.

The reading unit 16 reads a portable storage medium 1a including CD (Compact Disc)-ROM or DVD (Digital Versatile Disc)-ROM. The control unit 11 may read the control program 1P from the portable storage medium 1a through the reading unit 16 and store the control program 1P in the mass storage unit 17. In addition, the control unit 11 may download the control program 1P from another computer through the network N or the like and store the control program 1P in the mass storage unit 17. In addition, the control unit 11 may read the control program 1P from a semiconductor memory 1b.

Examples of the mass storage unit 17 include recording media such as an HDD (Hard disk drive) and an SSD (Solid State Drive). The mass storage unit 17 includes a satellite data DB (database) 171. The satellite data DB 171 stores information on satellite data.

In addition, in the present embodiment, the storage unit 12 and the mass storage unit 17 may be configured as an integrated storage device. In addition, the mass storage unit 17 may be configured by a plurality of storage devices. In addition, the mass storage unit 17 may be an external storage device connected to the server 1.

The server 1 may perform various kinds of information processing, control processing, and the like on a single computer, or may perform these processes in a distributed manner on a plurality of computers. In addition, the server 1 may be realized by a plurality of virtual machines provided in one server, or may be realized by using a cloud server.

FIG. 3 is an explanatory diagram showing an example of the record layout of the satellite data DB 171. The satellite data DB 171 includes a satellite data ID column, a type column, a satellite data column, a hash value column, and a satellite ID column. The satellite data ID column stores a uniquely identified satellite data ID in order to identify each piece of satellite data. The type column stores the type of satellite data. Types of satellite data include satellite images captured by the satellite 4, behavior data of the satellite 4, and command data of the satellite 4.

Satellite images include images obtained by an imaging apparatus mounted on the satellite 4, images captured by a UAS or UAF, optical images (optical satellite images), SAR (Synthetic Aperture Radar) images, hyperspectral images, and images obtained by an AI image processing apparatus that performs image processing using AI (Artificial Intelligence) technology. In addition, AI image processing may be performed by a ground-based computer or the like. The SAR image is an image obtained by processing data acquired by the SAR mounted on the satellite 4, an aircraft, or the like. The hyperspectral image is an image captured by a hyperspectral sensor mounted on the satellite 4.

In addition, the behavior data and the command data will be described later.

In addition, the types of satellite data are not limited to those described above. For example, the types of satellite data may include analysis result data obtained by analyzing satellite images, log data describing the orbit, altitude, posture, error range of the satellite 4, and the like. Examples of the analysis result data include identification results of areas included in the satellite image or data on changes in the identification results over time, and the like. Examples of the identification results of areas included in the satellite image include information indicating whether or not the target area has been flooded or estimated emissions of GHG (Greenhouse Gas), and the like.

The satellite data column stores satellite data. The hash value column stores the hash value of satellite data. The satellite ID column stores a satellite ID for identifying the satellite 4.

In addition, the storage form of each DB described above is an example, and other storage forms may be used as long as the relationship between the pieces of data is maintained.

Figure 4:
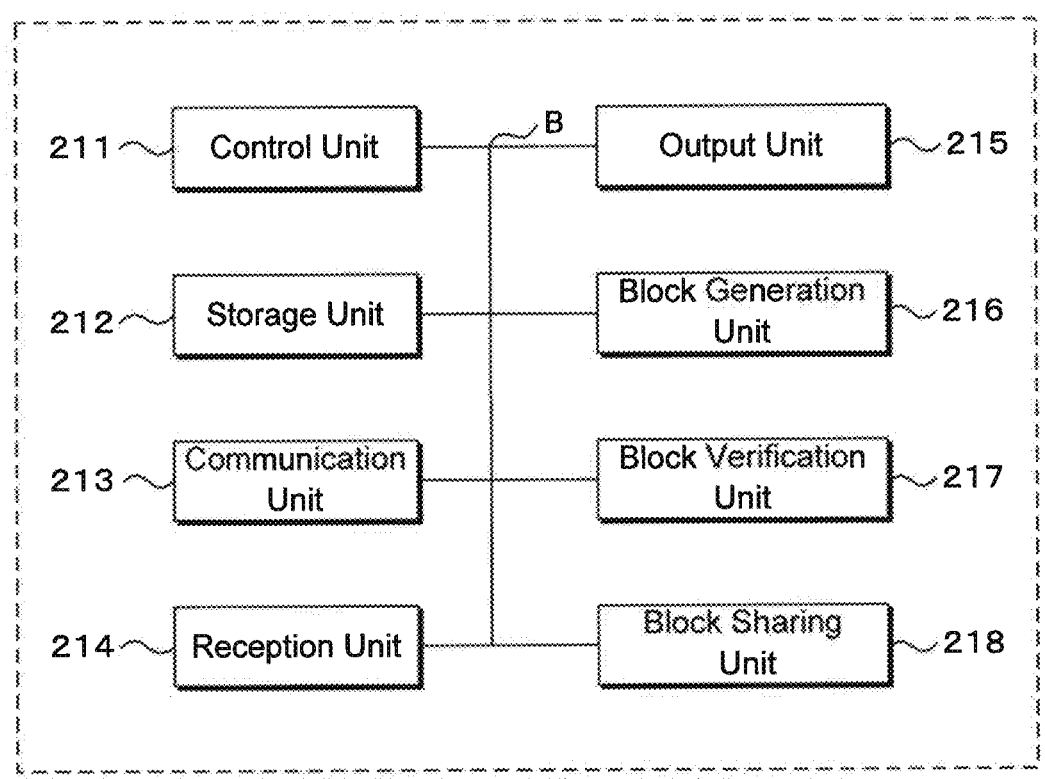
FIG. 4 is a block diagram showing an example of the configuration of a blockchain node.

FIG. 4 is a block diagram showing an example of the configuration of the node 21 of the blockchain 2. The node 21 of the blockchain 2 includes a control unit 211, a storage unit 212, a communication unit 213, a reception unit 214, an output unit 215, a block generation unit 216, a block verification unit 217, and a block sharing unit 218. The respective components are connected to each other by a bus B.

The control unit 211 always holds the latest blockchain (ledger: copy of blockchain data) in the storage unit 212 in autonomous decentralized cooperation with the control units 211 of the other nodes 21 (terminals). The storage unit 212 stores a blockchain (ledger) including transactions broadcasted to the distributed network, information necessary for verification processing of information in the block, and the like.

The communication unit 213 is a communication module for performing processing related to communication. The reception unit 214 receives information to be recorded in a distributed network, which is the blockchain 2 managed by the blockchain 2, from the external node 21. The output unit 215 outputs information of the blockchain 2 held by itself in response to a request from the external node 21.

The block generation unit 216 generates a block to be added to the blockchain 2 based on the information received by the reception unit 214. The block generation unit 216 generates a block including information based on the previous block and the information received by the reception unit 214. In addition, the block generation unit 216 performs, for example, processing for searching for a nonce or processing for adding a signature, as predetermined consensus processing, on a block generated by itself or a block generated by another node 21 through the block sharing unit 218 described later, and then adds the block to the blockchain 2 managed by itself. In addition, a block obtained by performing predetermined consensus processing on the block, which is generated by the block generation unit 216, by a plurality of nodes 21 is a block finally added to the blockchain 2.

The block verification unit 217 verifies information in a block when adding the block to the blockchain 2 held by itself. Normally, the block to be added is a block that satisfies the rule earliest in the node 21 group including its own node 21. However, considering a case where the malicious node 21 is included and the like, it may be verified whether or not the rule is actually satisfied.

The block sharing unit 218 transmits and receives information to and from the node 21 belonging to the blockchain 2. More specifically, the block sharing unit 218 appropriately transmits the information received by the reception unit 214, the block generated by the block generation unit 216, blocks received from other nodes 21, and the like to another node 21. Therefore, these pieces of information and the latest blockchain 2 are shared by all the nodes 21 as much as possible.

In addition, the configuration in FIG. 4 is merely an example, and the node 21 of the blockchain can have any configuration as long as it is possible to perform predetermined consensus processing for a plurality of nodes to share and manage the blockchain 2 that is difficult to tamper with and it is possible to add information to the distributed network and refer to information recorded in the distributed network in response to a request from an external node.

In addition, the server 1 may be the node 21 of the blockchain 2.

Figure 5:
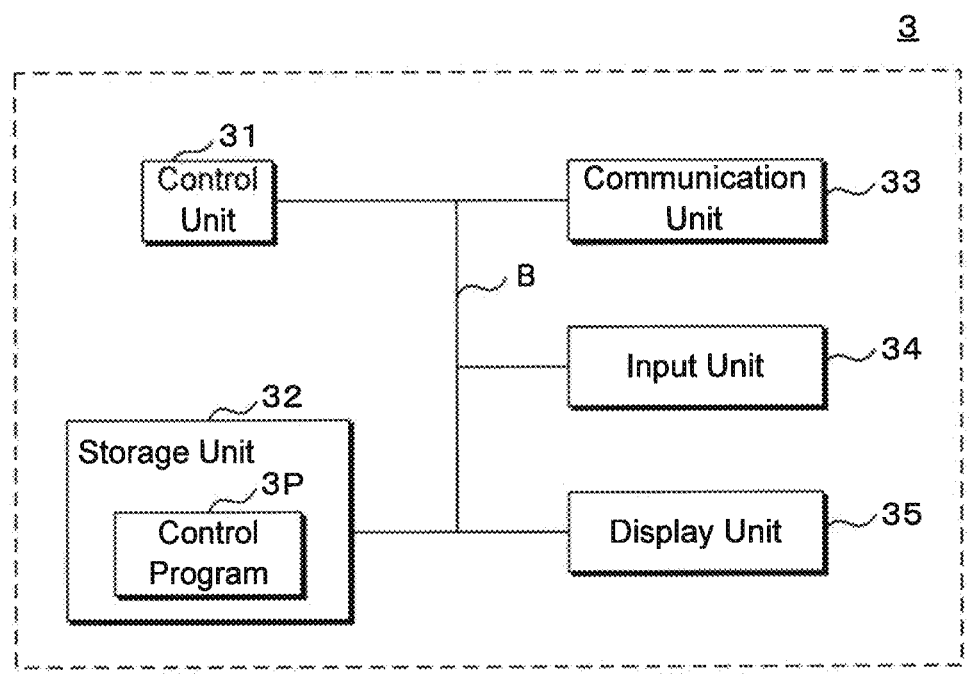
FIG. 5 is a block diagram showing an example of the configuration of a user terminal.

FIG. 5 is a block diagram showing an example of the configuration of the user terminal 3. The user terminal 3 includes a control unit 31, a storage unit 32, a communication unit 33, an input unit 34, and a display unit 35. The respective components are connected to each other by a bus B.

The control unit 31 includes an arithmetic processing unit such as a CPU and an MPU, and performs various kinds of information processing, control processing, and the like related to the user terminal 3 by reading and executing a control program 3P (program product) stored in the storage unit 32. In addition, although the control unit 31 is described as a single processor in FIG. 5, the control unit 11 may be a multiprocessor.

The storage unit 32 includes memory elements such as a RAM and a ROM, and stores the control program 3P, data, and the like necessary for the control unit 31 to perform processing. In addition, the storage unit 32 temporarily stores data and the like necessary for the control unit 31 to perform arithmetic processing.

The communication unit 33 is a communication module for performing processing related to communication, and transmits and receives information to and from the server 1 through the network N. The input unit 34 may be a keyboard, a mouse, or a touch panel integrated with the display unit 35. The display unit 35 is a liquid crystal display, an organic EL display, or the like, and displays various kinds of information according to instructions from the control unit 31.

Next, anti-tampering processing on satellite data will be described. Hereinafter, an example in which satellite data is a satellite image will be described. Anti-tampering processing on other types of satellite data will be described in a modification example below.

In order to prevent counterfeiting or tampering with satellite images, anti-tampering processing on the satellite images can be performed by using the blockchain 2. Specifically, the server 1 acquires a satellite image as an anti-tampering target from the satellite 4. The server 1 assigns a satellite image ID (satellite data ID) to the acquired satellite image. The server 1 calculates a hash value of the acquired satellite image using a cryptographic hash function.

The cryptographic hash function is a one-way cryptographic method for detecting tampering with a digital document, and the output value is always fixed to 64 digits as hexadecimal notation. For example, the server 1 may calculate the hash value of the satellite image by adopting a hash function using the SHA (Secure Hash Algorithm) 2-256 algorithm. In addition, although the hash function is used in the present embodiment, the present invention is not limited thereto and other methods for detecting tampering may be used. For example, tampering detection techniques such as checksum or HMAC (Hash Message Authentication Code), and the like, may be used.

The server 1 stores the type of satellite data that is a "satellite image", image data of the satellite image, the calculated hash value of the satellite image, and a satellite ID in the satellite data DB 171 as one record in association with the satellite image ID. The server 1 transmits the calculated hash value of the satellite image to one of the nodes 21 of the blockchain 2 in association with the satellite image ID. The node 21 of the blockchain 2 receives and records the satellite data ID and the hash value of the satellite image transmitted from the server 1.

Figure 6:
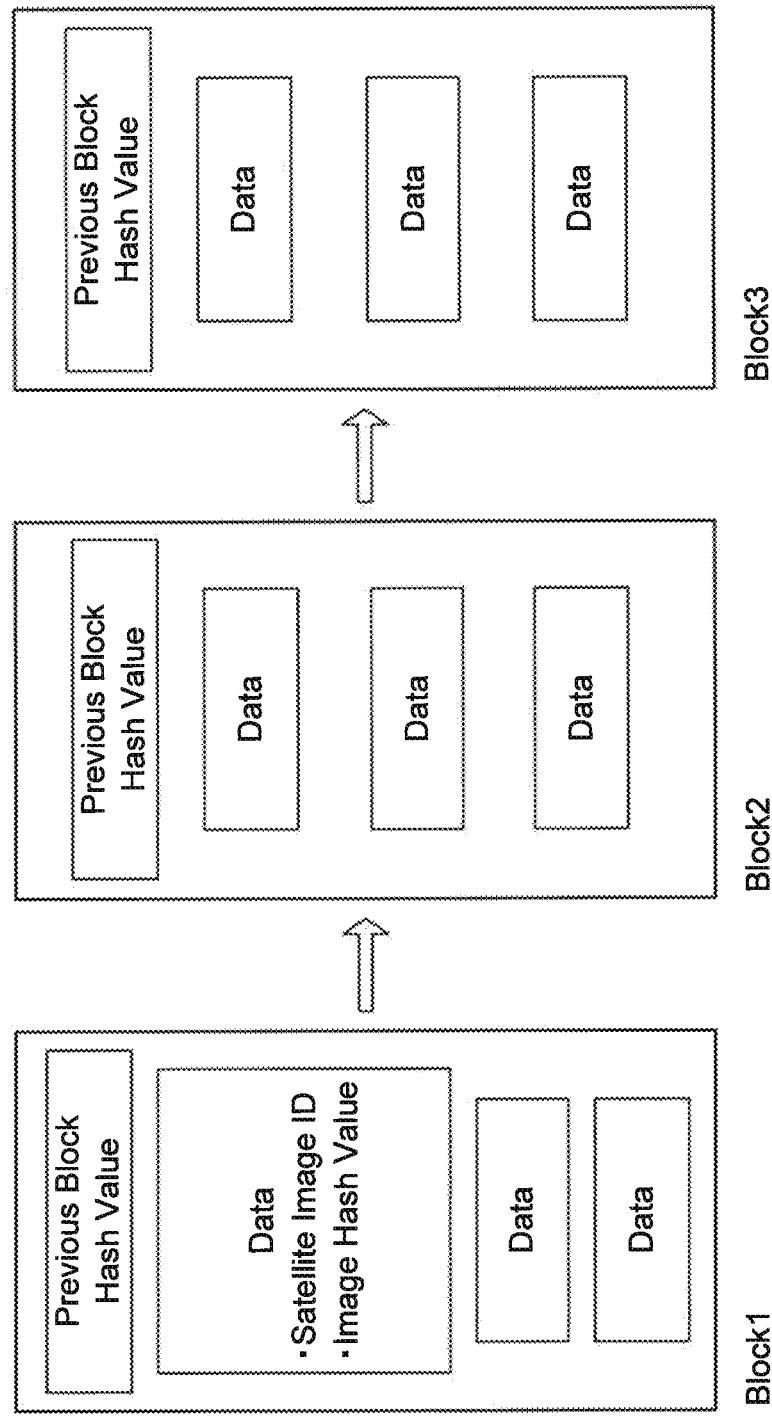
FIG. 6 is an explanatory diagram illustrating a process of recording the hash value of a satellite image in a blockchain node.

FIG. 6 is an explanatory diagram illustrating the process of recording a hash value of a satellite image in the node 21 of the blockchain 2. One node 21 of the blockchain 2 receives data (transaction) transmitted from the server 1. As shown in the diagram, the data includes a satellite image ID and a hash value of the satellite image. The node 21 generates a block including at least previous block management information created based on the satellite image ID and the hash value of the satellite image included in the received data and information of the blockchain managed by itself.

Then, each node 21 of the blockchain 2 performs processing according to a predetermined consensus algorithm. For example, when blockchain technology related to Bitcoin (registered trademark) is applied to this system, the node 21, the node 21, the node 21, . . . perform arithmetic processing called PoW (Proof of Work) and determine the node 21 to update the blockchain 2. PoW is arithmetic processing for searching for (mining) a correct value from the hash value stored in advance in a block immediately before a block to be newly generated.

When generating a new block, the node 21 generates a hash value obtained by hashing the hash value stored in a block immediately before the new block and data, and stores the hash value in the latest block. For example, as shown in FIG. 6, when generating a block 3, the node 21 generates a hash value by hashing the hash value stored in a block 2 and a plurality of pieces of data, and stores the hash value in the block 3. For example, in the example of bitcoin, the node 21 generates a hash value by inserting a nonce value into the header in addition to the data, in order to increase the difficulty of arithmetic processing. The nonce value is a value in which a predetermined number of zeros are consecutive in the header of the hash value, and the processing load of arithmetic processing is adjusted by designing the number of zeros related to the nonce value to an appropriate number.

When generating the latest block, each node 21 solves a search problem of searching for a correct value (nonce value in the example of Bitcoin) from the hash values included in the previous block. For example, as shown in FIG. 6, when generating the new block 3, each node 21 searches for a correct value from the hash values stored in the block 2. The probability of finding the correct value in one arithmetic processing is low, and for example, when applying blockchain technology related to cryptocurrency such as Bitcoin, it takes about 10 minutes on average. The respective nodes 21 simultaneously perform arithmetic processing of the search problem to search for the correct value. Then, the node 21 that finds the correct value earliest is given the authority to generate the latest block. When a fraudster attempts to rewrite the data of the blockchain, it is necessary to generate blocks at a speed exceeding the arithmetic processing speed of all bona fide verifiers (node 21). Therefore, it is extremely difficult to actually perform unauthorized rewriting.

When the search is successful, the node 21 generates a latest block storing the verified data (satellite image ID and hash value of the satellite image), and notifies the other nodes 21, 21, 21, . . . of data related to the block. In this case, as described above, the node 21 generates a hash value from the hash value stored in the previous block and data, stores the hash value in a new block, and then provides notification to each node 21.

For example, as shown in FIG. 6, the node 21 generates a hash value by hashing the hash value stored in the block 2 and data, stores the hash value in the new block 3, and provides notification to the other nodes 21, 21, 21, . . . . Since the hash values stored in a new block include the hash value of the previous block, the blocks that make up the blockchain are associated with each other in chronological order. The other nodes 21, 21, 21, . . . store the data in the storage unit 212 after checking the validity of the notified block data. As a result, data related to the same blockchain 2 is duplicated and stored in the storage unit 212 of each of the nodes 21, 21, 21, . . . .

In addition, the administrator (minor) of the node 21 that has succeeded in the search is given a reward for the successful search. That is, the administrator of the node 21 that has succeeded in the search is paid a commission for each transaction stored in the block. As a result, the administrator is given an incentive to input a computational resource called the node 21.

In addition, PoW is used as a method of determining the update authority of the blockchain 2 in the above, but the present embodiment is not limited thereto. For example, POI (Proof of Importance), POS (Proof of Stake), and the like, may be used. In addition, although the system to which the Bitcoin technology is applied has been described above, the present embodiment is not limited thereto. For example, in addition to Bitcoin, blockchain technology related to Ethereum, Hyperledger Fabric, and the like may be applied.

Since data such as satellite images are stored in a chain with past transaction history using the blockchain 2, it is difficult to tamper with the data, enabling highly reliable transactions. Therefore, it is possible to prevent tampering with satellite images.

In addition, the present invention is not limited to the anti-tampering processing using the blockchain 2. For example, a signature for digital authentication may be used. Specifically, the server 1 generates a satellite image with a digital signature for digital authentication based on public key cryptography in order to prevent counterfeiting or tampering. The server 1 transmits the generated satellite image with a digital signature to a terminal (hereinafter, referred to as an authentication terminal) such as an institution or service provider (electronic certification authority) that performs authentication processing of the satellite image.

The authentication terminal verifies the validity of the digital signature of the satellite image by using a public key used when generating the satellite image with a digital signature. Specifically, the authentication terminal decrypts the satellite image with a digital signature created with a private key using a public key that is paired with the private key. The authentication terminal detects whether or not there has been tampering by comparing the hash value decrypted using the public key with the hash value of the satellite image at the time of provision. If the satellite image is tampered with after being digitally signed, the hash value of the decrypted satellite image no longer matches the hash value of the satellite image at the time of provision. Therefore, the digital signature itself becomes invalid. In this manner, since the encrypted satellite image with a digital signature can be decrypted with a public key, the authenticity of the satellite image can be verified.

Figure 7:
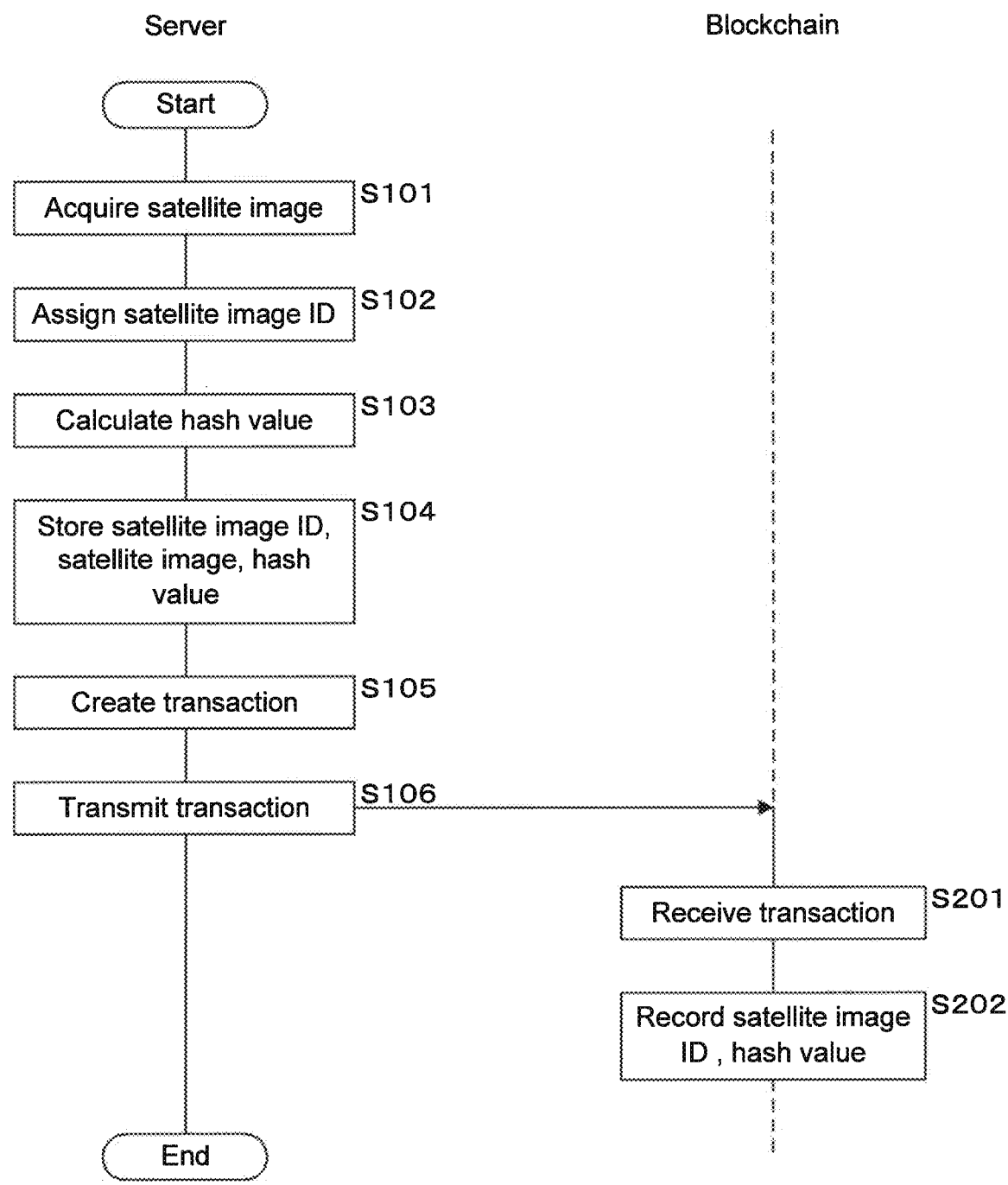
FIG. 7 is a flowchart showing a processing procedure when performing anti-tampering processing on satellite data.

FIG. 7 is a flowchart showing a processing procedure when performing anti-tampering processing on satellite data. The control unit 11 of the server 1 acquires a satellite image as an anti-tampering target from the satellite 4 through the communication unit 13 (step S101). In addition, when the satellite image is stored in advance in the storage unit 12 or the mass storage unit 17, the control unit 11 may acquire the satellite image from the storage unit 12 or the mass storage unit 17. The control unit 11 assigns a satellite image ID to the acquired satellite image (step S102).

The control unit 11 calculates a hash value of the acquired satellite image using a cryptographic hash function (step S103). The control unit 11 stores the type of satellite data that is a "satellite image", image data of the satellite image, the calculated hash value of the satellite image, and the satellite ID in the satellite data DB 171 of the mass storage unit 17 as one record in association with the assigned satellite image ID (step S104).

The control unit 11 creates a transaction for anti-tampering processing on the satellite image (step S105). The transaction is a transaction record in the blockchain 2, and stores various kinds of information and transfer of value between participants in the blockchain 2. The created transaction includes a satellite image ID, a hash value of the satellite image, and the like. The control unit 11 transmits the created transaction to one of the nodes 21 of the blockchain 2 through the communication unit 13 (step S106).

The control unit 211 of the node 21 of the blockchain 2 receives the transaction transmitted from the server 1 through the communication unit 213 (step S201). The control unit 211 records the satellite image ID and the hash value of the satellite image included in the received transaction in the storage unit 212 (step S202).

Specifically, the control unit 211 of the node 21 that has received the transaction generates, through the block generation unit 216, a block including at least previous block management information created based on the satellite image ID and the hash value of the satellite image included in the received transaction and information of the blockchain 2 managed by itself. Then, the control unit 211 of each node 21 of the blockchain 2 performs predetermined consensus processing by using the block generation unit 216. The blockchain 2 is a time-series arrangement of data groups having a predetermined data structure called blocks, and serves as a ledger in which transaction details are recorded. Each block includes information of blocks located before the block by one or more blocks (hereinafter, referred to as previous blocks) and information (nonce, signature, and the like) for detecting whether or not there has been tampering, in addition to data to be recorded in the block, such as transaction details. The nonce is a value in a predetermined data area that is set so that a value obtained when the data in the data area is processed by a one-way function satisfies a predetermined rule.

A new block is added to the blockchain 2 through processing according to a predetermined consensus algorithm in which two or more nodes participate. For example, in PoW, which is one of the consensus algorithms, a rule such as "the Hash value of the block should be equal to or less than a threshold value" is determined in advance for each block (data group) including the information of the previous block and the nonce. When adding a block, processing in which a plurality of nodes concurrently searches for a nonce that satisfies such a rule is performed by the block verification unit 217. In addition, other than PoW, there are consensus algorithms such as BFT (Byzantine fault tolerance). After performing predetermined consensus processing, the control unit 211 of each node 21 of the blockchain 2 records (adds) the block generated by the block generation unit 216 in the storage unit 212 through the block sharing unit 218.

According to the present embodiment, it is possible to perform anti-tampering processing on satellite images.

According to the present embodiment, by performing anti-tampering processing on satellite images, it is possible to realize satellite images that are difficult to tamper with and have high reliability.

MODIFICATION EXAMPLE 1

A process will be described in which, when a processed satellite image is acquired by performing machine learning processing on a satellite image, anti-tampering processing on the satellite image is performed.

For example, the server 1 performs processing to increase the resolution of the satellite image using a learning model that has been trained to output a high-resolution processed satellite image when a satellite image is input. The server 1 performs anti-tampering processing on the satellite image that has been subjected to the high resolution processing, similarly to the above-described anti-tampering processing.

The server 1 transmits the satellite image after the anti-tampering processing to the user terminal 3. The user terminal 3 receives the satellite image after the anti-tampering processing transmitted from the server 1, and displays the received satellite image on the screen.

According to Modification Example 1, it is possible to perform anti-tampering processing on a processed satellite image obtained by performing machine learning processing on a satellite image.

MODIFICATION EXAMPLE 2

A process will be described in which anti-tampering processing on the behavior data of the satellite 4 is performed.

Figure 8:
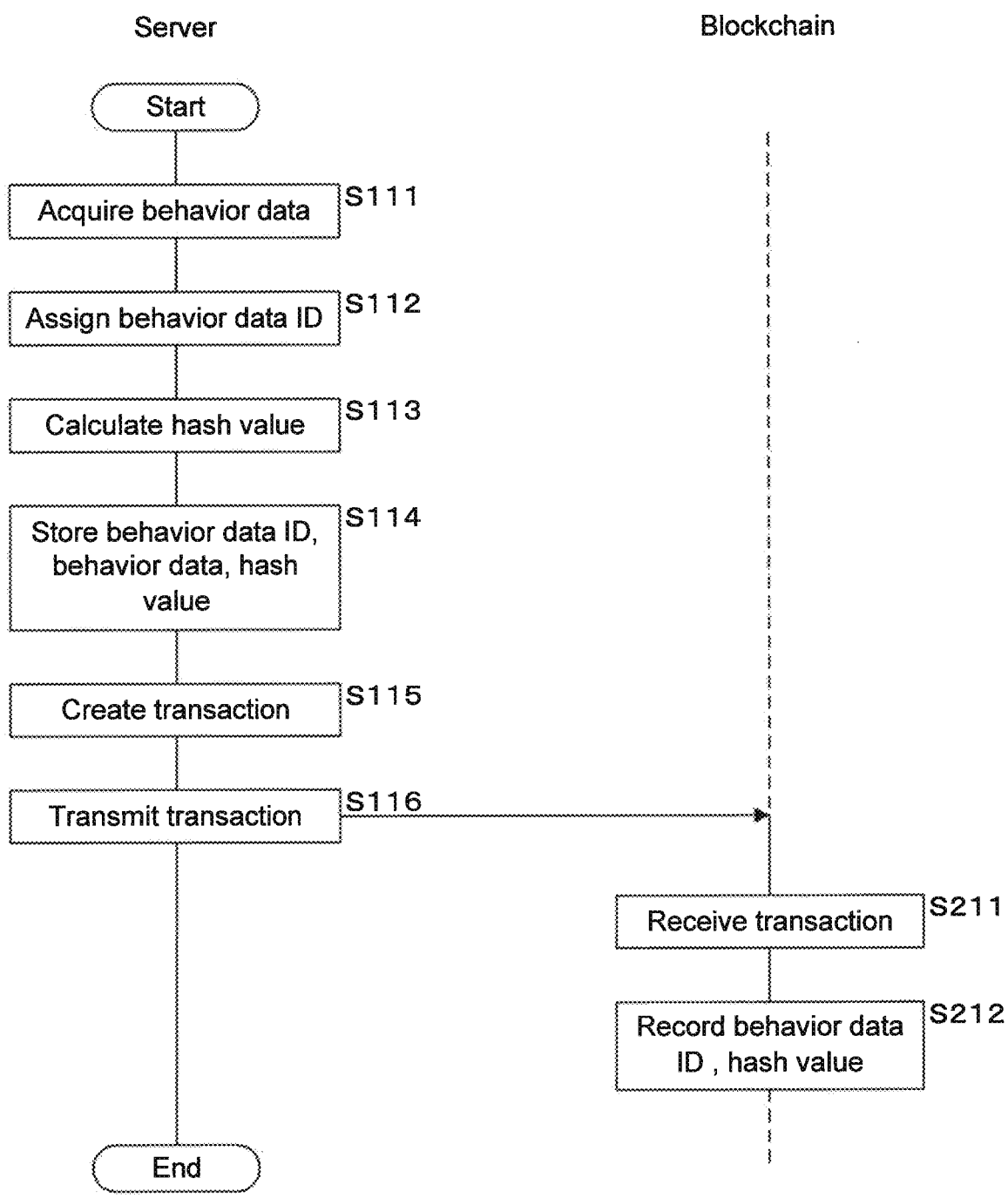
FIG. 8 is a flowchart showing a processing procedure when performing anti-tampering processing on behavior data.

FIG. 8 is a flowchart showing a processing procedure when performing anti-tampering processing on behavior data. The control unit 11 of the server 1 acquires behavior data as an anti-tampering target from the satellite 4 through the communication unit 13 (step S111). The behavior data includes the imaging time, imaging position, posture at the time of imaging, orbit data of the satellite 4, and the like.

The control unit 11 assigns a behavior data ID (satellite data ID) to the acquired behavior data (step S112). The control unit 11 calculates a hash value of the acquired behavior data using a cryptographic hash function (step S113). The control unit 11 stores the type of satellite data that is "behavior data", behavior data, the calculated hash value of the behavior data, and the satellite ID in the satellite data DB 171 of the mass storage unit 17 as one record in association with the assigned behavior data ID (step S114).

The control unit 11 creates a transaction for anti-tampering processing on the behavior data (step S115). The created transaction includes a behavior data ID, a hash value of the behavior data, and the like. The control unit 11 transmits the created transaction to one of the nodes 21 of the blockchain 2 through the communication unit 13 (step S116).

The control unit 211 of the node 21 of the blockchain 2 receives the transaction transmitted from the server 1 through the communication unit 213 (step S211). The control unit 211 records, in the storage unit 212, the behavior data ID and the hash value of the behavior data included in the received transaction (step S212).

According to Modification Example 2, it is possible to perform anti-tampering processing on the behavior data of the satellite 4.

MODIFICATION EXAMPLE 3

A process will be described in which anti-tampering processing on the command data of the satellite 4 is performed.

Figure 9:
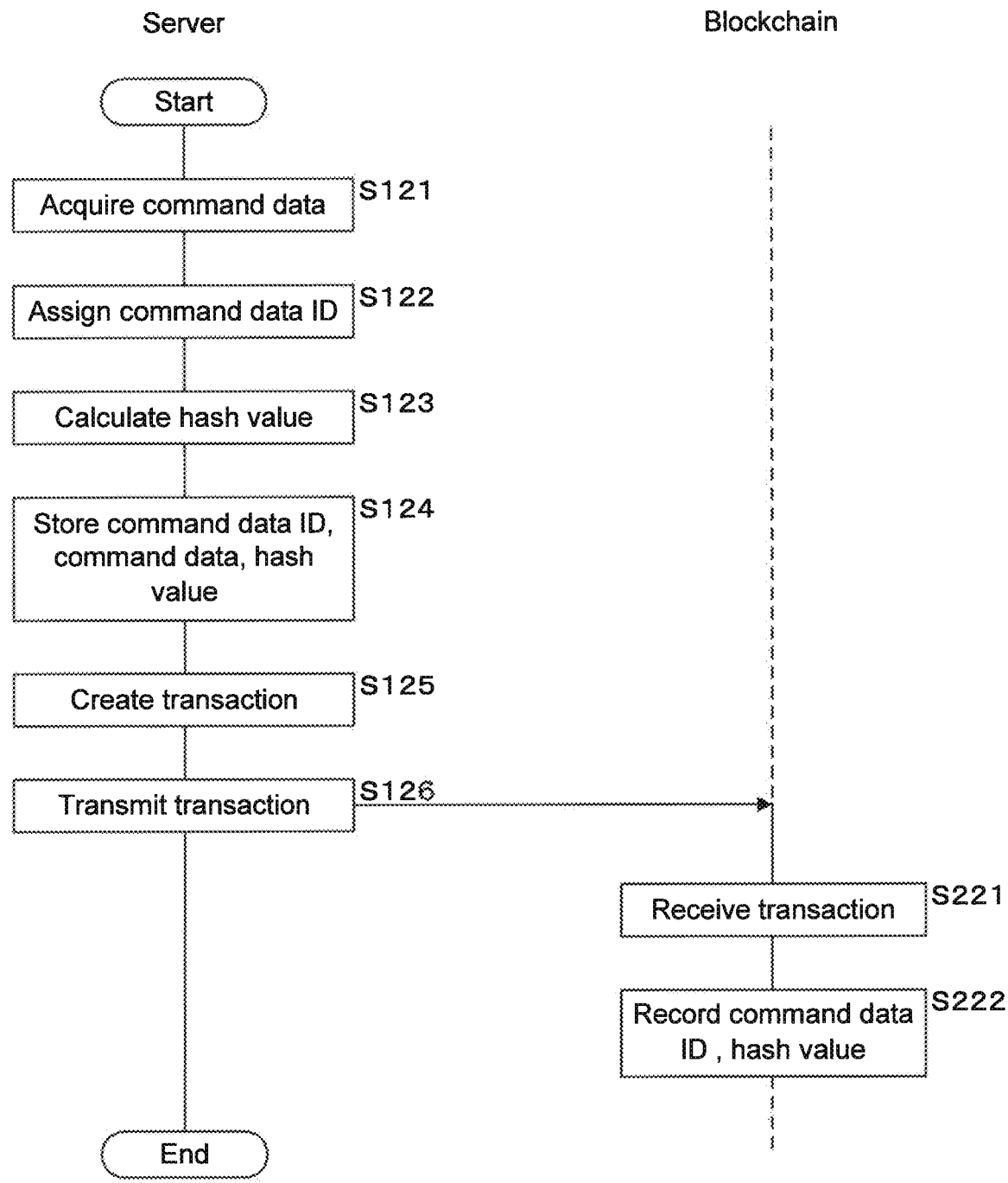
FIG. 9 is a flowchart showing a processing procedure when performing anti-tampering processing on command data.

FIG. 9 is a flowchart showing a processing procedure when performing anti-tampering processing on command data. The control unit 11 of the server 1 acquires command data as an anti-tampering target from the satellite 4 through the communication unit 13 (step S121). The command data includes commands for controlling the orbit, altitude, posture, temperature, and the like of the satellite 4, the execution time when the satellite 4 executed the command, and the like.

The control unit 11 assigns a command data ID (satellite data ID) to the acquired command data (step S122). The control unit 11 calculates the hash value of the acquired command data using a cryptographic hash function (step S123). The control unit 11 stores the type of satellite data that is "command data", command data, the calculated hash value of the command data, and the satellite ID in the satellite data DB 171 of the mass storage unit 17 as one record in association with the assigned command data ID (step S124).

The control unit 11 creates a transaction for anti-tampering processing on the command data (step S125). The created transaction includes a command data ID, a hash value of the command data, and the like. The control unit 11 transmits the created transaction to one of the nodes 21 of the blockchain 2 through the communication unit 13 (step S126).

The control unit 211 of the node 21 of the blockchain 2 receives the transaction transmitted from the server 1 through the communication unit 213 (step S221). The control unit 211 records, in the storage unit 212, the command data ID and the hash value of the command data included in the received transaction (step S222).

According to Modification Example 3, it is possible to perform anti-tampering processing on the command data of the satellite 4.

MODIFICATION EXAMPLE 4

The types of satellite data further include observation data of the satellite 4. The observation data is data obtained by observing the earth, outer space, and the like using a sensor or the like mounted on the satellite 4. For example, the observation data includes various kinds of data, such as meteorological data (temperature, precipitation, wind direction or speed, and the like), terrestrial data (temperature, pressure, and the like on the earth's surface), plant activity, and areas where disasters have occurred. In Modification Example 4, a process will be described in which anti-tampering processing on the observation data of the satellite 4 is performed.

Figure 10:
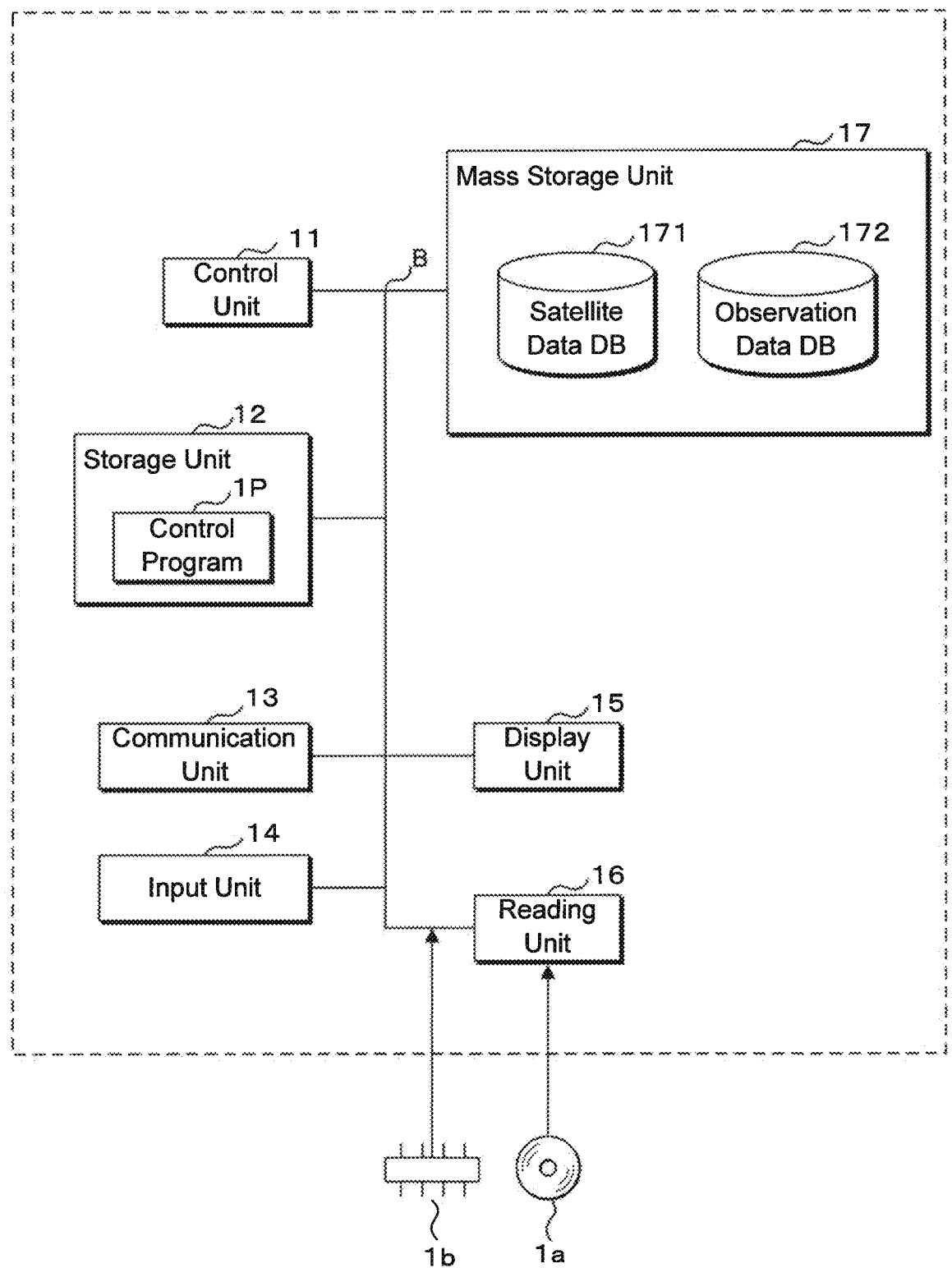
FIG. 10 is a block diagram showing an example of the configuration of a server in Modification Example 4.

FIG. 10 is a block diagram showing an example of the configuration of the server 1 in Modification Example 4. In addition, the same contents as in FIG. 2 are denoted by the same reference numerals, and the description thereof will be omitted. The mass storage unit 17 includes an observation data DB 172. The observation data DB 172 stores observation data of the satellite 4.

FIG. 11 is an explanatory diagram showing an example of the record layout of the observation data DB 172. The observation data DB 172 includes an observation data ID column, an observation data column, a hash value column, a satellite ID column, and an observation date and time column. The observation data ID column stores a uniquely identified observation data ID in order to identify each piece of observation data. The observation data column stores the observation data. The hash value column stores the hash value of the observation data. The satellite ID column stores a satellite ID for identifying a satellite. The observation date and time column stores the date and time when the observation data was observed.

Figure 12:
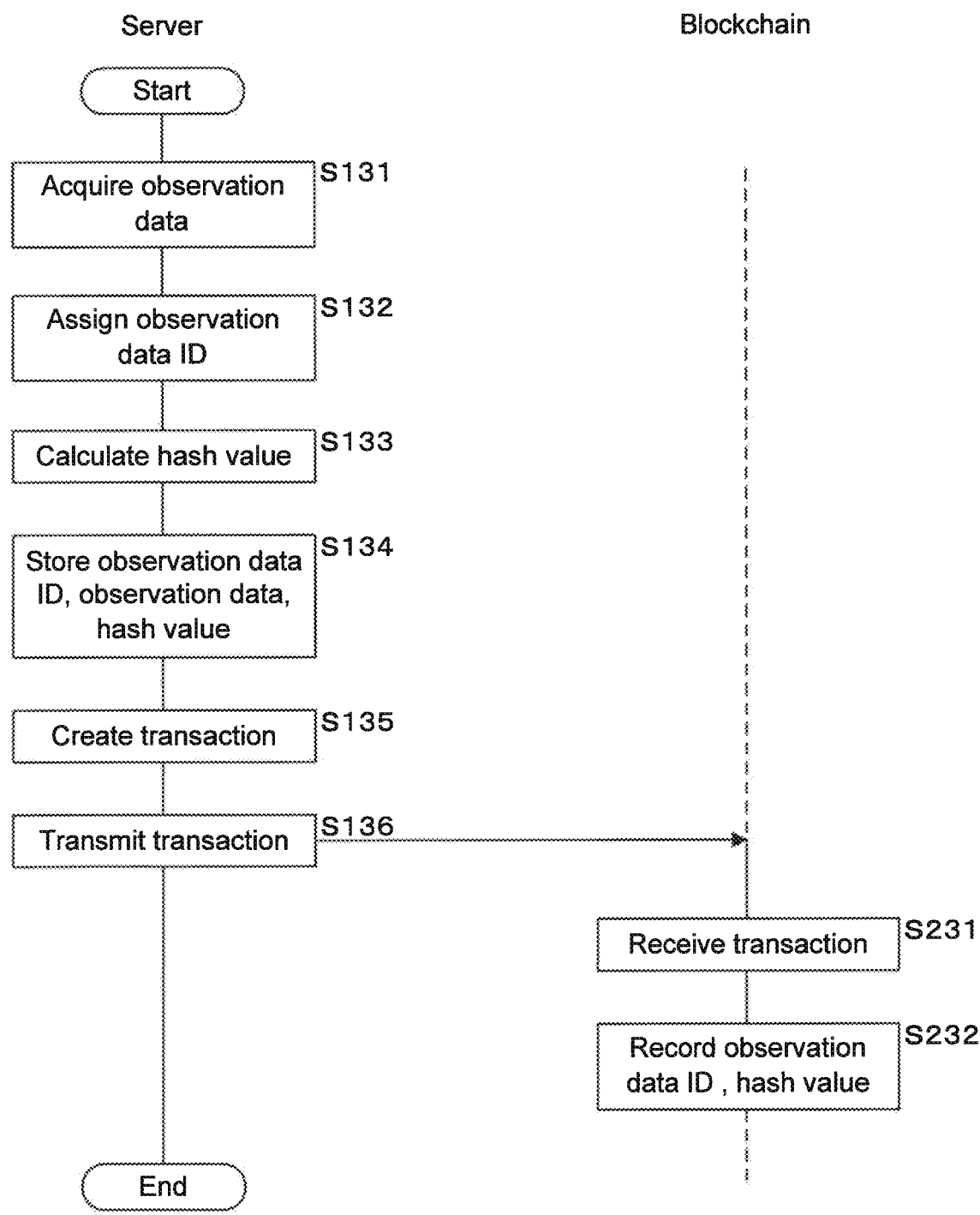
FIG. 12 is a flowchart showing a processing procedure when performing anti-tampering processing on observation data.

FIG. 12 is a flowchart showing a processing procedure when performing anti-tampering processing on observation data. The control unit 11 of the server 1 acquires observation data as an anti-tampering target from the satellite 4 through the communication unit 13 (step S131). The control unit 11 assigns an observation data ID to the acquired observation data (step S132).

The control unit 11 calculates the hash value of the acquired observation data using a cryptographic hash function (step S133). The control unit 11 stores the observation data, the calculated hash value of the observation data, and the satellite ID in the observation data DB 172 of the mass storage unit 17 as one record in association with the assigned observation data ID (step S134).

The control unit 11 creates a transaction for anti-tampering processing on the observation data (step S135). The created transaction includes an observation data ID, a hash value of the observation data, and the like. The control unit 11 transmits the created transaction to one of the nodes 21 of the blockchain 2 through the communication unit 13 (step S136).

The control unit 211 of the node 21 of the blockchain 2 receives the transaction transmitted from the server 1 through the communication unit 213 (step S231). The control unit 211 records, in the storage unit 212, the observation data ID and the hash value of the observation data included in the received transaction (step S232).

According to Modification Example 4, it is possible to perform anti-tampering processing on the observation data of the satellite 4.

EMBODIMENT 2

Embodiment 2 relates to a form in which authentication processing is performed on satellite data (satellite images, behavior data, command data, observation data, and the like). In addition, the description of the same contents as in Embodiment 1 will be omitted.

Hereinafter, an example of authentication processing on a satellite image, which is one type of satellite data, will be described. The user terminal 3 acquires a satellite image as an authentication target. The user terminal 3 displays the acquired satellite image on an authentication screen (FIG. 13) for verifying the authenticity of the satellite image. When an authentication request from a user is received through the authentication screen, the user terminal 3 transmits the received authentication request to the server 1. The authentication request includes a user ID, a satellite image ID of the satellite image as an authentication target, and image data of the satellite image.

The server 1 calculates a hash value of the satellite image included in the authentication request transmitted from the user terminal 3. The server 1 acquires the hash value of the satellite image stored on the node 21 of the blockchain 2 based on the satellite image ID included in the authentication request. In addition, the server 1 may acquire the hash value of the satellite image stored in the satellite data DB 171 based on the satellite image ID. The server 1 determines whether or not the calculated hash value of the satellite image matches the stored hash value of the satellite image.

When it is determined that the two hash values match, the server 1 determines that the satellite image is a true satellite image and the authentication is successful. Conversely, when it is determined that the two hash values do not match, the server 1 determines that the satellite image is an invalid satellite image and the authentication has failed. The server 1 transmits the authentication result and the authentication date and time for the satellite image to the user terminal 3. The authentication result includes the satellite image ID, information indicating whether or not the authentication is successful, and the like. The user terminal 3 receives the authentication result and the authentication date and time transmitted from the server 1, and displays these on the screen.

Figure 13:
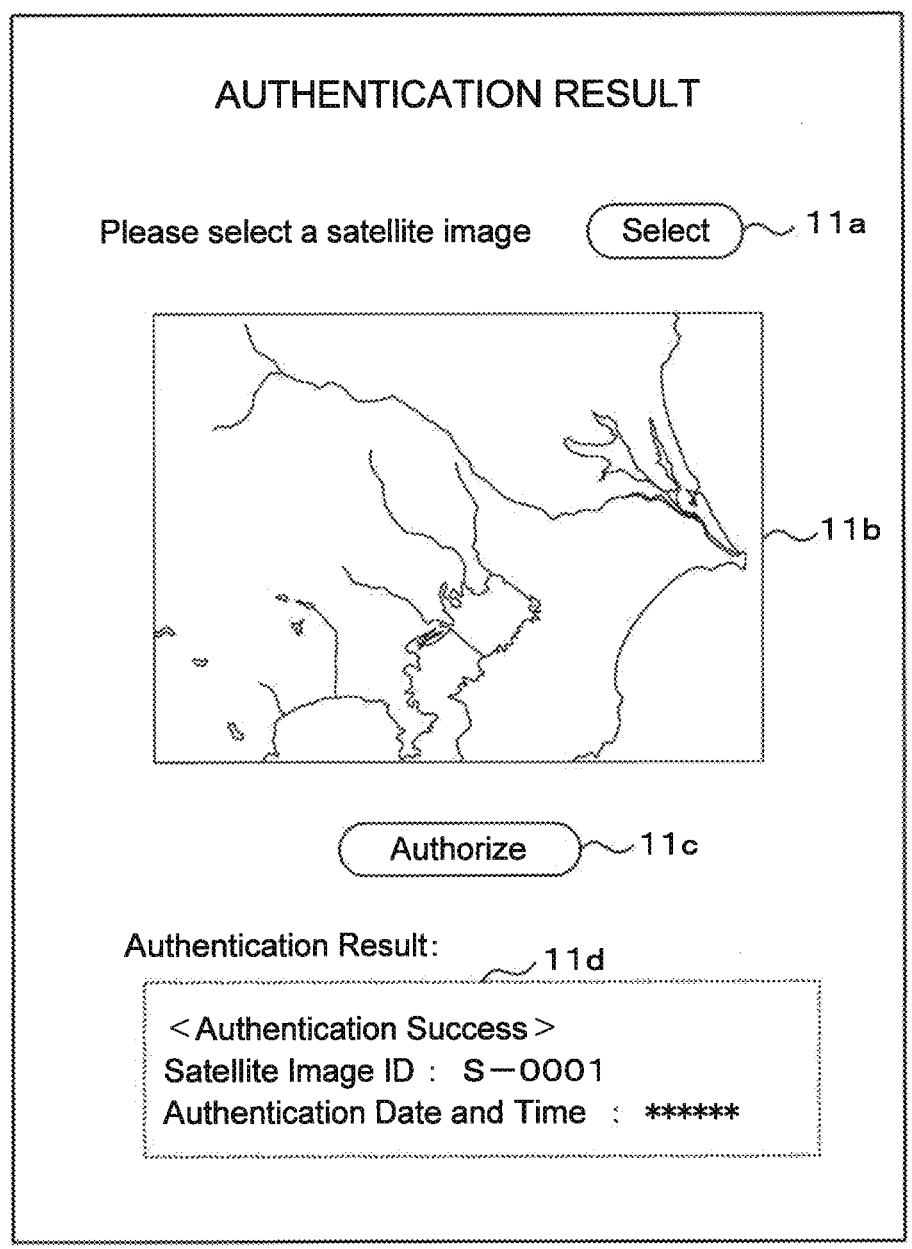
FIG. 13 is an explanatory diagram showing an example of an authentication screen for a satellite image.

FIG. 13 is an explanatory diagram showing an example of an authentication screen of a satellite image. The screen includes a selection button 11*a*, a satellite image display field 11*b*, an authentication button 11*c*, and an authentication result display field 11*d*.

The selection button 11*a* is a button for selecting a satellite image as an authentication target. The satellite image display field 11*b* is a display field for displaying a satellite image. The authentication button 11*c* is a button for authenticating the authenticity of the satellite image. The authentication result display field 11*d* is a display field for displaying the authentication result of the satellite image.

When a touch operation on the selection button 11*a* is received, the user terminal 3 displays a selection screen (not shown) on which a satellite image can be selected. The user terminal 3 receives the user's selection of the satellite image as an authentication target through the selection screen. The user terminal 3 displays the received satellite image in the satellite image display field 11*b*. When a touch operation on the authentication button 11*c* is received, the user terminal 3 transmits the selected satellite image to the server 1 in association with the satellite image ID.

The server 1 receives the satellite image ID and the satellite image transmitted from the user terminal 3. The server 1 performs authentication processing on the received satellite image. In addition, since the authentication processing on the satellite image is the same as the authentication processing described above, the description thereof will be omitted. The server 1 transmits the satellite image authentication result and the authentication date and time to the user terminal 3. The user terminal 3 receives the authentication result and the authentication date and time transmitted from the server 1, and displays the received authentication result and authentication date and time in the authentication result display field 11*d*. As shown in the diagram, information indicating whether or not the authentication is successful, the satellite image ID, and the authentication date and time are displayed in the authentication result display field 11*d*.

Figure 14:
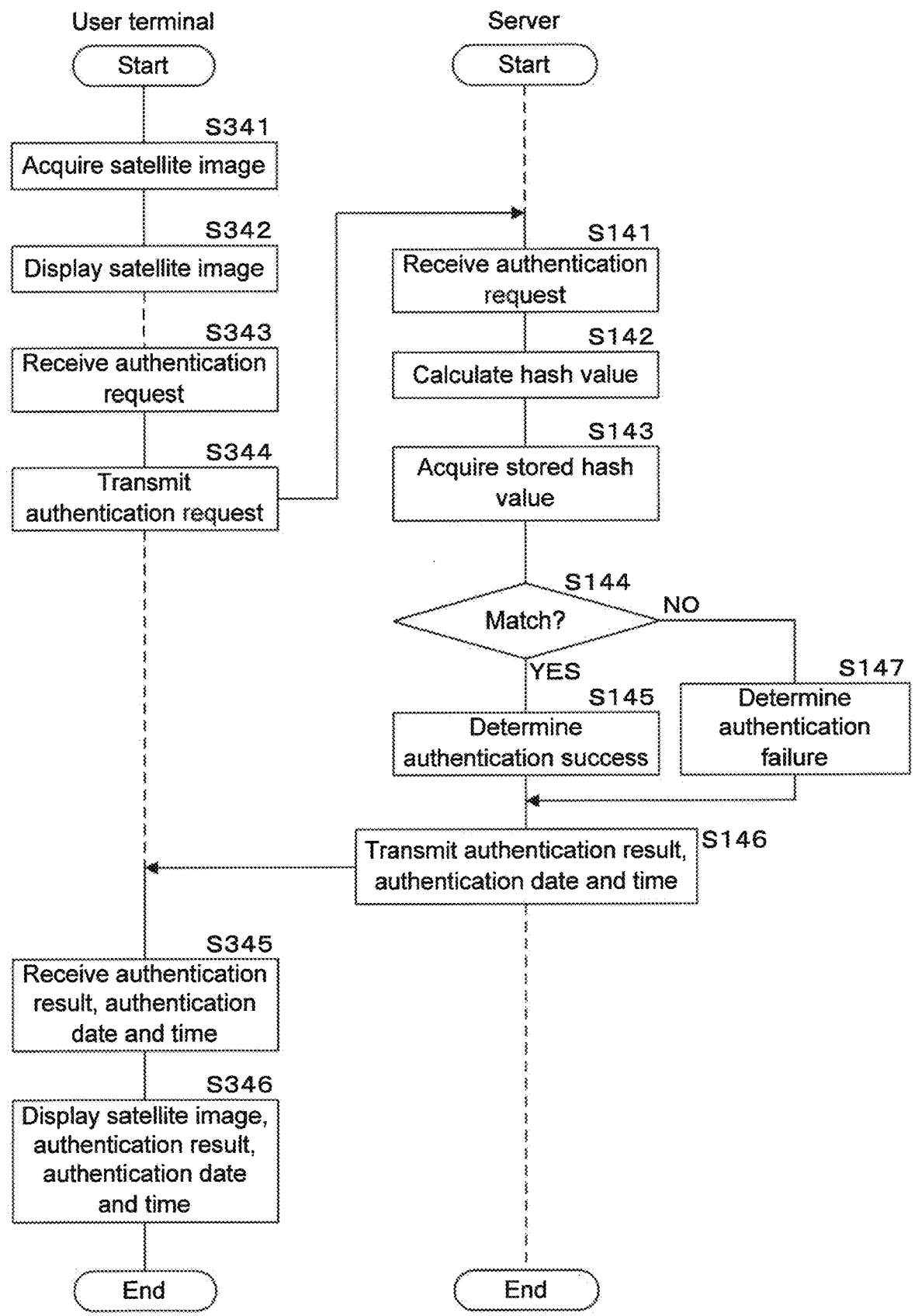
FIG. 14 is a flowchart showing a processing procedure when authenticating a satellite image.

FIG. 14 is a flowchart showing a processing procedure when authenticating a satellite image. The control unit 31 of the user terminal 3 acquires the satellite image as an authentication target from the storage unit 12 or the mass storage unit 17 (step S341). In addition, the control unit 31 may acquire the satellite image from an external information processing apparatus through the communication unit 33. The control unit 31 displays the acquired satellite image on the display unit 35 (step S342).

The control unit 31 receives the user's authentication request through the input unit 34 (step S343). The authentication request includes the satellite image ID of the satellite image as an authentication target and image data of the satellite image. The control unit 31 transmits the received authentication request to the server 1 through the communication unit 33 (step S344). The control unit 11 of the server 1 receives the authentication request transmitted from the user terminal 3 through the communication unit 13 (step S141). The control unit 11 calculates a hash value of the satellite image included in the received authentication request using a cryptographic hash function (step S142).

Based on the satellite image ID included in the authentication request, the control unit 11 acquires the hash value of the satellite image corresponding to the satellite image from the node 21 of the blockchain 2 through the communication unit 13 (step S143). In addition, the control unit 11 may acquire the hash value of the satellite image from the satellite data DB 171 of the mass storage unit 17 based on the satellite image ID. The control unit 11 determines whether or not the calculated hash value of the satellite image matches the stored hash value of the satellite image (step S144).

When it is determined that the two hash values do not match (NO in step S144), the control unit 11 determines that the authentication of the satellite image has failed (step S147). The control unit 11 proceeds to the processing of step S146, which will be described later. When it is determined that the two hash values match (YES in step S144), the control unit 11 determines that the authentication of the satellite image is successful (step S145).

The control unit 11 transmits the satellite image ID, the authentication result of the satellite image including information indicating whether or not the authentication is successful, and the authentication date and time to the user terminal 3 through the communication unit 13 (step S146). The control unit 31 of the user terminal 3 receives the authentication result and the authentication date and time transmitted from the server 1 through the communication unit 33 (step S345). The control unit 31 displays the satellite image and the received authentication result and authentication date and time on the display unit 35 (step S346), and ends the process.

In addition, the above-described authentication processing can be similarly applied to behavior data of the satellite 4, command data of the satellite 4, or observation data of the satellite 4. The server 1 transmits the authentication result for the behavior data, command data, or observation data to the user terminal 3 together with the satellite image captured by the satellite 4. The user terminal 3 receives the authentication result and the satellite image transmitted from the server 1. The user terminal 3 displays the authentication result for the received behavior data, command data, or observation data on the screen in association with the satellite image captured by the satellite 4.

Figure 15:
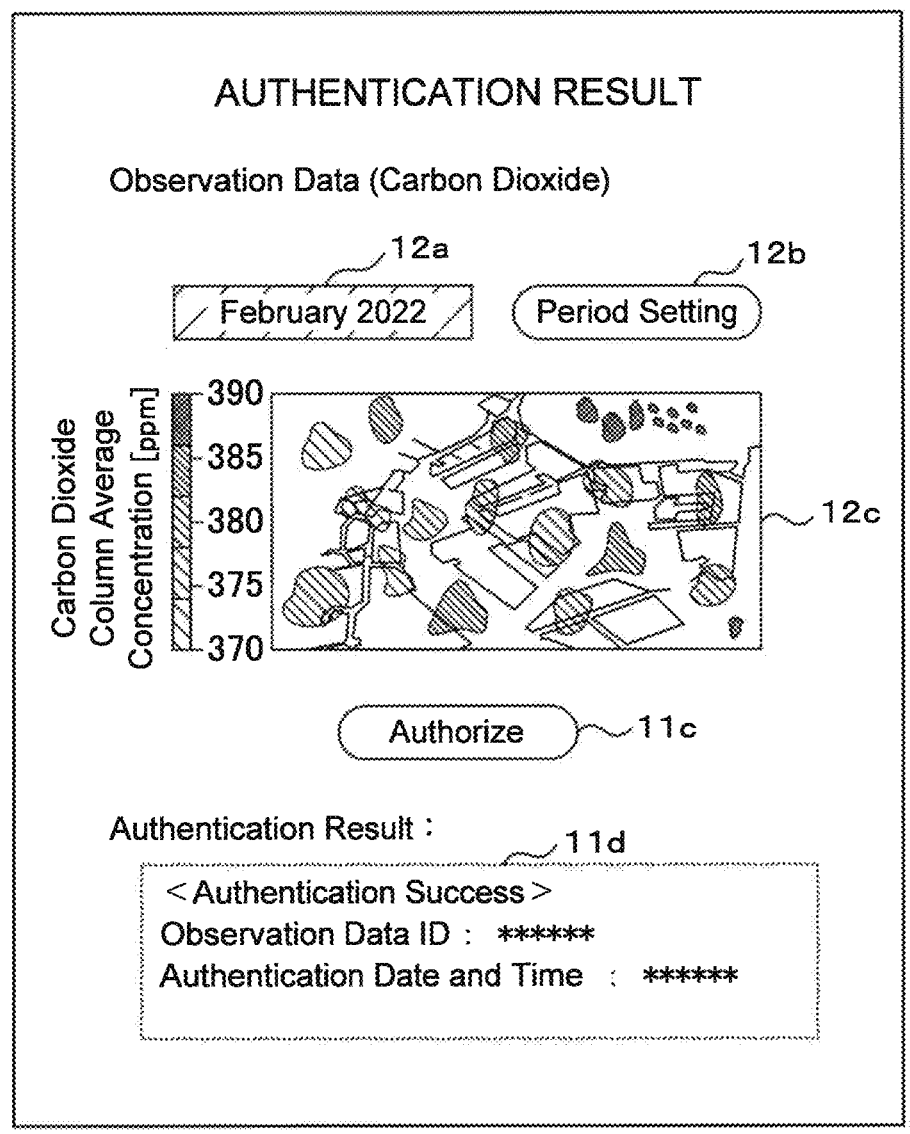
FIG. 15 is an explanatory diagram showing an example of an authentication screen for observation data.

FIG. 15 is an explanatory diagram showing an example of an authentication screen for observation data. In addition, the same contents as in FIG. 13 are denoted by the same reference numerals, and the description thereof will be omitted. In addition, although FIG. 15 illustrates an example in which the observation data is carbon dioxide data, it can be similarly applied to other types of observation data.

The screen includes an observation period display field 12*a*, an observation period setting button 12*b*, and an observation data display field 12*c*. The observation period display field 12*a* is a display field for displaying the observation period of carbon dioxide data. The observation period setting button 12*b* is a button for receiving the setting of an observation period. The observation data display field 12*c* is a display field for displaying the time-series data of carbon dioxide, or, a graph, an image, and the like generated by totaling the time-series data of fluctuations.

When a touch operation on the observation period setting button 12*b* is received, the user terminal 3 displays a setting screen (not shown) on which the observation period can be set. The user terminal 3 receives the observation period set by the user through the setting screen. The user terminal 3 displays the received observation period in the observation period display field 12*a* and transmits the observation period to the server 1.

The server 1 acquires the corresponding time-series data of carbon dioxide from the observation data DB 172 according to the observation period transmitted from the user terminal 3. The server 1 generates, for example, a heat map of carbon dioxide concentration that shows the concentration distribution of carbon dioxide based on the acquired time-series data. The server 1 transmits the generated heat map of carbon dioxide concentration to the user terminal 3.

The user terminal 3 receives the heat map of carbon dioxide concentration transmitted from the server 1, and displays the received heat map of carbon dioxide concentration in the observation data display field 12*c*. Although FIG. 15 illustrates an example in which a heat map showing the concentration distribution based on the time-series data of carbon dioxide is displayed, the present invention is not limited thereto. For example, the time-series data of carbon dioxide may be displayed directly in the observation data display field 12*c*.

When a touch operation on the authentication button 11*c* is received, the user terminal 3 transmits to the server 1 the observation period set by the observation period setting button 12*b*. The server 1 receives the observation period transmitted from the user terminal 3. The server 1 acquires the observation data ID of each piece of carbon dioxide data within the observation period according to the received observation period. The server 1 acquires a hash value of each piece of carbon dioxide data stored on the node 21 of the blockchain 2 based on each observation data ID acquired.

For the time-series data of carbon dioxide for the target observation period, the server 1 determines whether or not the hash value of each piece of carbon dioxide data acquired from the node 21 of the blockchain 2 matches the hash value of each piece of carbon dioxide data stored in the observation data DB 172. When it is determined that the hash values of the pieces of carbon dioxide data at all points in time match, the server 1 determines that the authentication of the carbon dioxide data for the observation period is successful.

The server 1 transmits the authentication result of the carbon dioxide data and the authentication date and time to the user terminal 3. The user terminal 3 receives the authentication result and the authentication date and time transmitted from the server 1, and displays the received authentication result and authentication date and time in the authentication result display field 11*d*. As shown in the diagram, information indicating whether or not the authentication is successful, the observation data ID, and the authentication date and time are displayed in the authentication result display field 11*d*.

In addition, in FIG. 15, the authentication button 11*c* is provided, but the present invention is not limited thereto. For example, when the authentication button 11*c* is not provided, the server 1 transmits an authentication result, which is obtained by performing authentication processing on the target carbon dioxide data, to the user terminal 3 together with the carbon dioxide data. The user terminal 3 may directly display the carbon dioxide data and the authentication result transmitted from the server 1 on the screen.

According to the present embodiment, it is possible to perform authentication processing on a satellite image and output the authentication result of the satellite image.

According to the present embodiment, it is possible to perform authentication processing on behavior data of the satellite 4, command data of the satellite 4, or observation data of the satellite 4 and output the authentication result of the behavior data, the command data, or the observation data.

EMBODIMENT 3

Embodiment 3 relates to a form in which a satellite image NFT (Non-Fungible Token) corresponding to a satellite image is issued on the blockchain 2. In addition, the description of the same contents as in Embodiments 1 and 2 will be omitted.

NFTs are digital data with a certificate of authenticity or proof of ownership, and blockchain technology is used for data management like cryptocurrency and accordingly, it is not possible to tamper with or counterfeit NFTs. A satellite image NFT is issued on the blockchain 2, and is proof of ownership of the satellite image by linking the satellite image with the NFT.

FIG. 16 is an explanatory diagram showing an example of the record layout of the satellite data DB 171 in Embodiment 3. In addition, the same contents as in FIG. 3 are denoted by the same reference numerals, and the description thereof will be omitted. The satellite data DB 171 includes a satellite image NFT column and a serial number column. The satellite image NFT column stores satellite image NFTs issued on the blockchain 2. For example, on the blockchain 2, satellite image NFTs whose "authenticity" or "value" can be proven like a certificate of authenticity may be issued using ERC 721, which is one of Ethereum's smart contract standards. When the ERC 721 is used, the satellite image NFT has a token ID, an owner address, a token Uniform Resource Identifier (URI), and the like.

For example, the satellite image NFT column stores an index on the blockchain 2 that includes the token ID, owner address, token URI, and the like of the satellite image NFT. In addition, when the satellite image NFT is issued, the token ID, owner address, token URI, and the like of the satellite image NFT are stored on the blockchain 2. The token URI is an attribute that indicates the location of metadata for the satellite image NFT. The location of metadata is, for example, a URL (Uniform Resource Locator) of the metadata (an image, a video, and the like). In addition, the metadata itself may be stored in an external database device in a JSON (JavaScript Object Notation) format, for example.

The serial number column stores a serial number for the upper limit number in the satellite image NFT. The serial number is a series of unique numbers assigned to identify the satellite image NFT.

Figure 17:
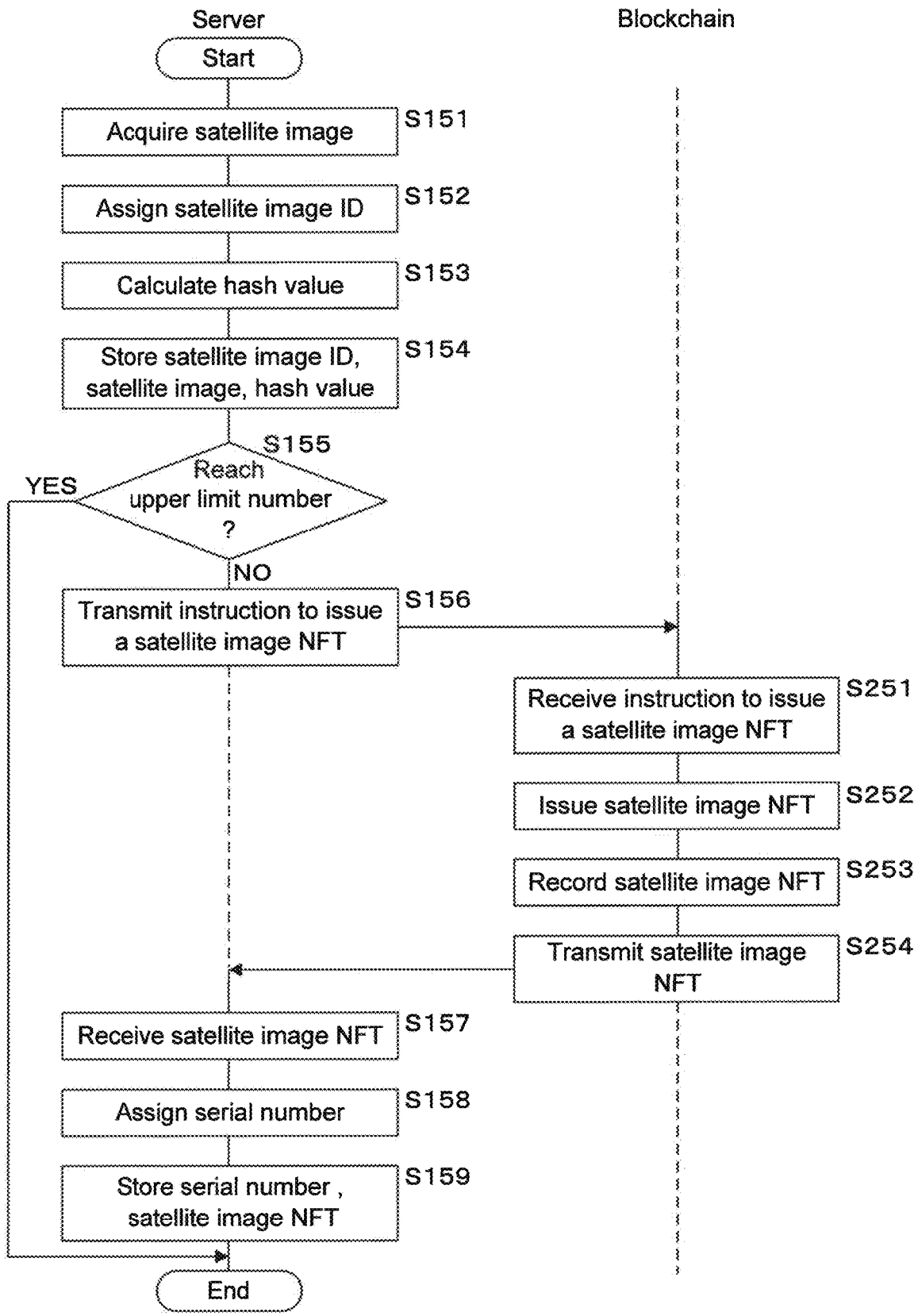
FIG. 17 is a flowchart showing a processing procedure when issuing a satellite image NFT.

FIG. 17 is a flowchart showing a processing procedure when issuing a satellite image NFT. The control unit 11 of the server 1 acquires a satellite image, for which a satellite image NFT is to be issued, through the communication unit 13 or the input unit 14 (step S151). The control unit 11 performs the processing of steps S152 to S154. In addition, since the processing of steps S152 to S154 is the same as the processing of steps S102 to S104 in FIG. 7, the description thereof will be omitted.

The control unit 11 determines whether or not the upper limit number of issuances for the satellite image NFT has been reached (step S155). In addition, the upper limit number of issuances may be stored in advance in the storage unit 12 or the mass storage unit 17. When it is determined that the upper limit number of issuances has been reached (YES in step S155), the control unit 11 ends the process. When it is determined that the upper limit number of issuances has not been reached (NO in step S155), the control unit 11 transmits an instruction to issue a satellite image NFT to one of the nodes 21 of the blockchain 2 through the communication unit 13 (step S156).

The control unit 211 of the node 21 of the blockchain 2 receives the instruction to issue a satellite image NFT transmitted from the server 1 through the communication unit 213 (step S251). In response to the received issuance instruction, the control unit 211 of the node 21 issues a satellite image NFT on the blockchain 2 (step S252). The control unit 211 of the node 21 records the token ID, owner address, and token URI of the issued satellite image NFT in the storage unit 212 (step S253).

The control unit 211 of the node 21 transmits the issued satellite image NFT to the server 1 through the communication unit 213 (step S254). The control unit 11 of the server 1 receives the satellite image NFT transmitted from the node 21 of the blockchain 2 through the communication unit 13 (step S157). The control unit 11 assigns a serial number to the received satellite image NFT (step S158). The control unit 11 stores the assigned serial number and the received satellite image NFT in the satellite data DB 171 of the mass storage unit 17 in association with the satellite image ID (step S159). The control unit 11 ends the process.

In addition, a satellite image corresponding to the satellite image NFT can be displayed.

Figure 18:
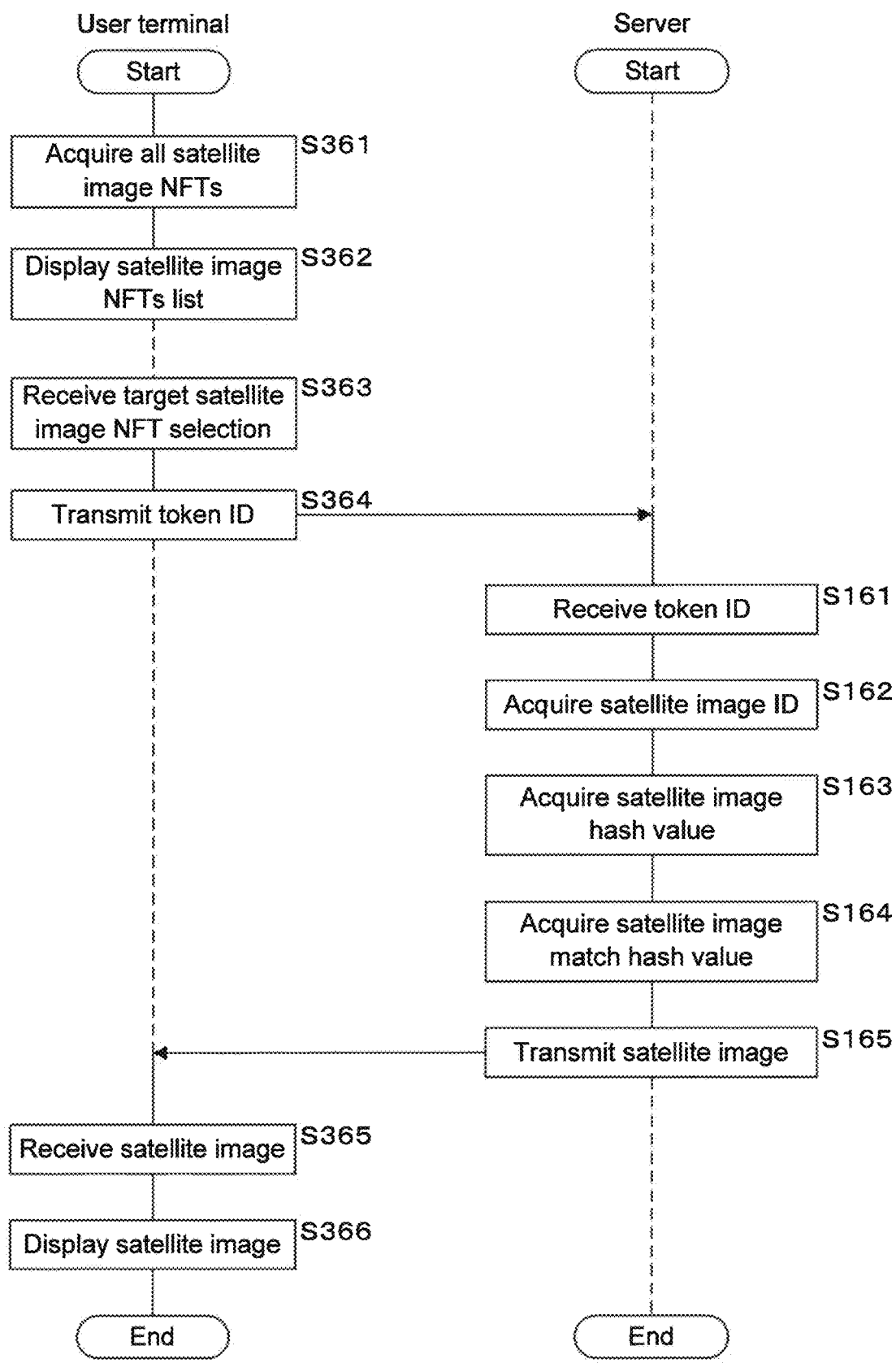
FIG. 18 is a flowchart showing a processing procedure when displaying a satellite image corresponding to a satellite image NFT.

FIG. 18 is a flowchart showing a processing procedure when displaying a satellite image corresponding to the satellite image NFT. The control unit 31 of the user terminal 3 acquires all satellite image NFTs owned by the user, which have been issued corresponding to satellite images captured by the satellite 4, from the node 21 of the blockchain 2 through the communication unit 33 by using the user's crypto wallet (step S361). Each satellite image NFT includes a token ID, an owner address, a token URI, and the like.

The control unit 31 displays a list of acquired satellite image NFTs on the display unit 35 (step S362). The control unit 31 receives the user's satellite image NFT selection through the input unit 34 (step S363). The control unit 31 transmits the token ID of the received satellite image NFT to the server 1 through the communication unit 33 (step S364).

The control unit 11 of the server 1 receives the token ID transmitted from the user terminal 3 through the communication unit 13 (step S161). Based on the received token ID, the control unit 11 acquires the satellite image ID of the satellite image corresponding to the satellite image NFT from the satellite data DB 171 of the mass storage unit 17 (step S162). Based on the acquired satellite image ID, the control unit 11 acquires the hash value of the satellite image stored on the blockchain 2 through the communication unit 13 (step S163).

Based on the acquired hash value of the satellite image, the control unit 11 acquires a satellite image that matches the hash value stored in the satellite data DB 171 of the mass storage unit 17 (step S164). The control unit 11 transmits the acquired satellite image to the user terminal 3 through the communication unit 13 (step S165). The control unit 31 of the user terminal 3 receives the satellite image transmitted from the server 1 through the communication unit 33 (step S365). The control unit 31 displays the received satellite image on the display unit 35 (step S366), and ends the process.

In addition, a satellite image and behavior data corresponding to the satellite image NFT can be displayed.

Figure 19:
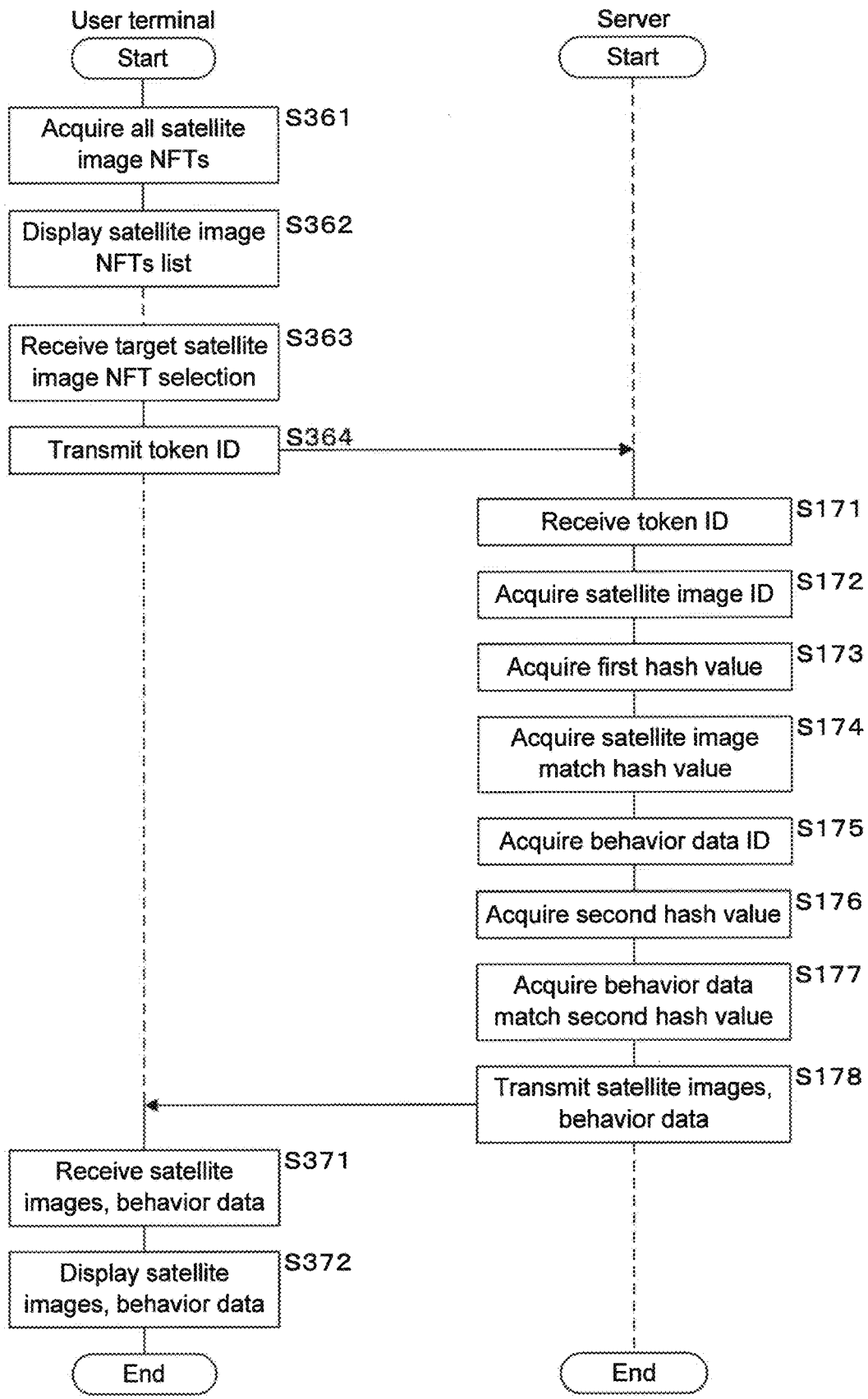
FIG. 19 is a flowchart showing a processing procedure when displaying a satellite image and behavior data corresponding to a satellite image NFT.

FIG. 19 is a flowchart showing a processing procedure when displaying a satellite image and behavior data corresponding to a satellite image NFT. In addition, the same contents as in FIG. 18 are denoted by the same reference numerals, and the description thereof will be omitted.

The control unit 11 of the server 1 receives the token ID transmitted from the user terminal 3 through the communication unit 13 (step S171). Based on the received token ID, the control unit 11 acquires the satellite image ID (satellite data ID) of the satellite image corresponding to the satellite image NFT from the satellite data DB 171 of the mass storage unit 17 (step S172). Based on the acquired satellite image ID, the control unit 11 acquires the hash value of the satellite image stored on the blockchain 2 as a first hash value through the communication unit 13 (step S173). Based on the acquired first hash value, the control unit 11 acquires a satellite image that matches the hash value stored in the satellite data DB 171 of the mass storage unit 17 (step S174).

Based on the received token ID, the control unit 11 acquires, from the satellite data DB 171 of the mass storage unit 17, the behavior data ID (satellite data ID) of the behavior data of the satellite 4 that captured the satellite image corresponding to the satellite image NFT (step S175). Based on the acquired behavior data ID, the control unit 11 acquires the hash value of the behavior data stored on the blockchain 2 as a second hash value through the communication unit 13 (step S176). Based on the acquired second hash value, the control unit 11 acquires behavior data of the satellite 4 that matches the hash value stored in the satellite data DB 171 of the mass storage unit 17 (step S177).

The control unit 11 transmits the acquired satellite images and behavior data to the user terminal 3 through the communication unit 13 (step S178). The control unit 31 of the user terminal 3 receives the satellite image and the behavior data transmitted from the server 1 through the communication unit 33 (step S371). The control unit 31 displays the received satellite image and behavior data on the display unit 35 (step S372), and ends the process.

In addition, although the display processing on the satellite image corresponding to the satellite image NFT or the behavior data of the satellite 4 that captured the satellite image has been described in the present embodiment, the present invention is not limited thereto. For example, command data of the satellite 4 or observation data of the satellite 4 may be displayed.

Next, a process of paying cryptocurrency (crypto asset) to an administrator who manages a satellite image corresponding to a satellite image NFT with the transfer of the satellite image NFT.

The owner of the satellite image NFT corresponding to the satellite image can transfer the satellite image NFT to another person on the blockchain 2. For example, when transferring a satellite image NFT owned by a first user to a second user on the blockchain 2, the ownership of the satellite image NFT is transferred from the first user to the second user.

With the transfer of the satellite image, cryptocurrency calculated according to a predetermined standard can be paid to the administrator who manages the satellite image corresponding to the satellite image NFT. In addition, although cryptocurrency has been described as an example in the present embodiment, the present invention is not limited thereto. For example, legal currency, electronic money, coupons, and points may be used.

Figure 20:
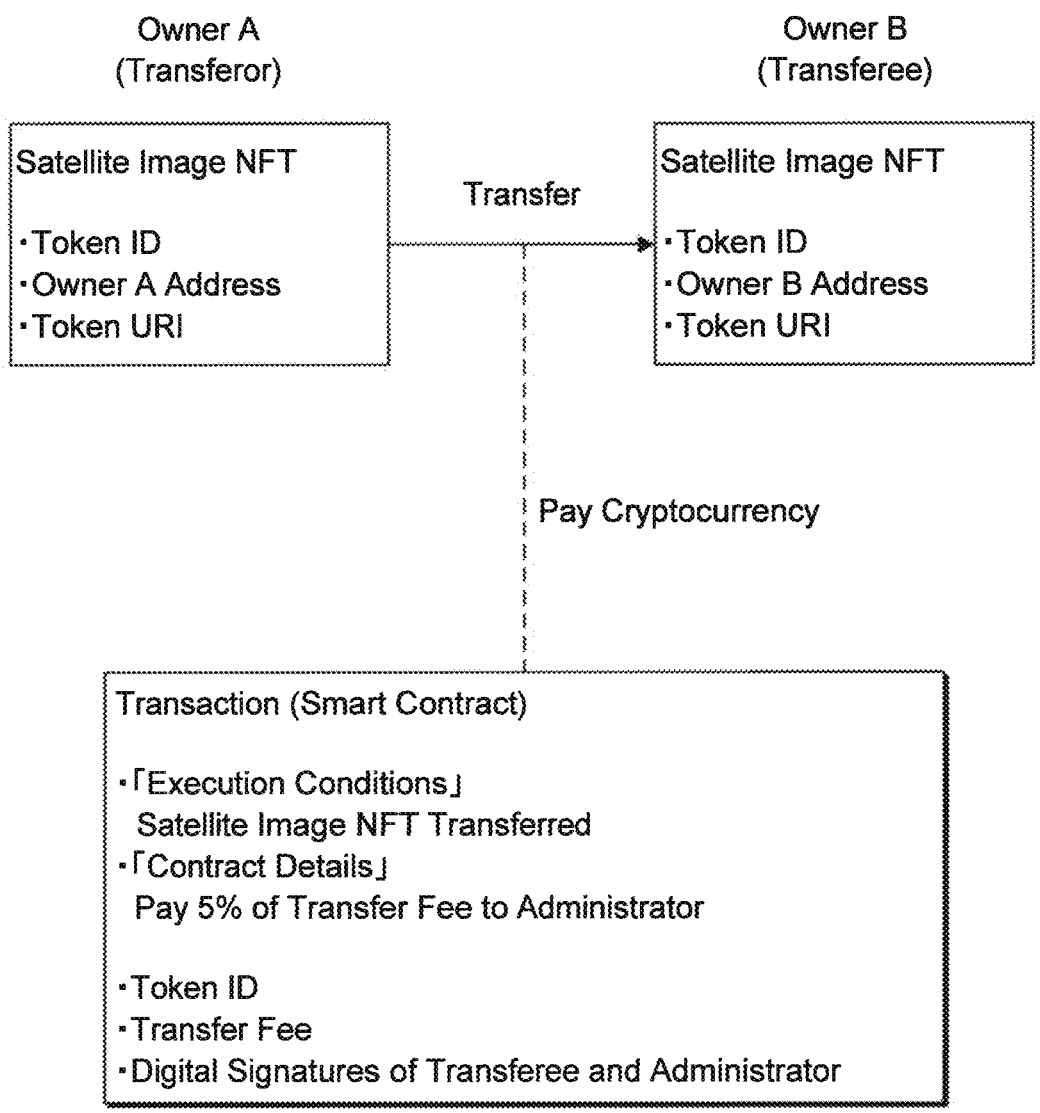
FIG. 20 is an explanatory diagram illustrating a process for making a payment to an administrator using a smart contract.

FIG. 20 is an explanatory diagram illustrating a process of making a payment to the administrator using a smart contract. An owner A, who owns a satellite image NFT, can transfer the satellite image NFT to an owner B. When the satellite image NFT is transferred from the owner A to the owner B, the transfer of the satellite image NFT is completed by making a change from the address of the owner A to the address of the owner B on the ERC 721.

With the transfer of the satellite image NFT, cryptocurrency calculated according to a predetermined standard is paid to the administrator using a smart contract for making a payment to the administrator who manages the satellite image. The smart contract is a mechanism in which definitions of execution conditions and contract details are programmed in advance and incorporated into transactions and contracts are automatically fulfilled when a transaction that matches the execution conditions and the contract details occurs.

The server 1 generates a smart contract code that describes the execution conditions, the contract details, the wallet address of the administrator, and the like necessary for making a payment to the administrator. The server 1 records a transaction including the generated smart contract code in the blockchain 2 in advance.

In the present embodiment, the content of the smart contract code defines a contract to pay cryptocurrency calculated according to predetermined standard to the administrator's wallet address when the satellite image NFT is transferred. In the present embodiment, a single smart contract is included in a single transaction, but the present invention is not limited thereto. For example, a plurality of linked smart contracts may be included in a single transaction or a plurality of transactions.

As shown in the diagram, the transaction includes the smart contract code, a token ID corresponding to the satellite image NFT, a transfer fee, and digital signatures of the transferee and the administrator. When the execution conditions for the transfer of the satellite image NFT are satisfied, the blockchain 2 pays the amount of cryptocurrency determined in the contract details from the wallet address of the transferee (owner B) to the administrator's wallet address.

For example, when the transfer fee is the amount of cryptocurrency of 100, the amount of cryptocurrency of 5, which is 5% of the transfer fee, is paid to the administrator based on the contract details. In addition, the owner B's cryptocurrency may be deposited in advance in the smart contract. In this case, the corresponding amount of cryptocurrency is paid from the deposited cryptocurrency to the administrator's wallet address.

In addition, although an example in which the amount of cryptocurrency paid to the administrator is calculated based on the transfer fee has been described in the present embodiment, the present invention is not limited thereto. For example, the amount of cryptocurrency paid to the administrator may be a fixed amount (for example, the amount of cryptocurrency of 10). In addition, the operator of the system may pay cryptocurrency to the administrator.

Figure 21:
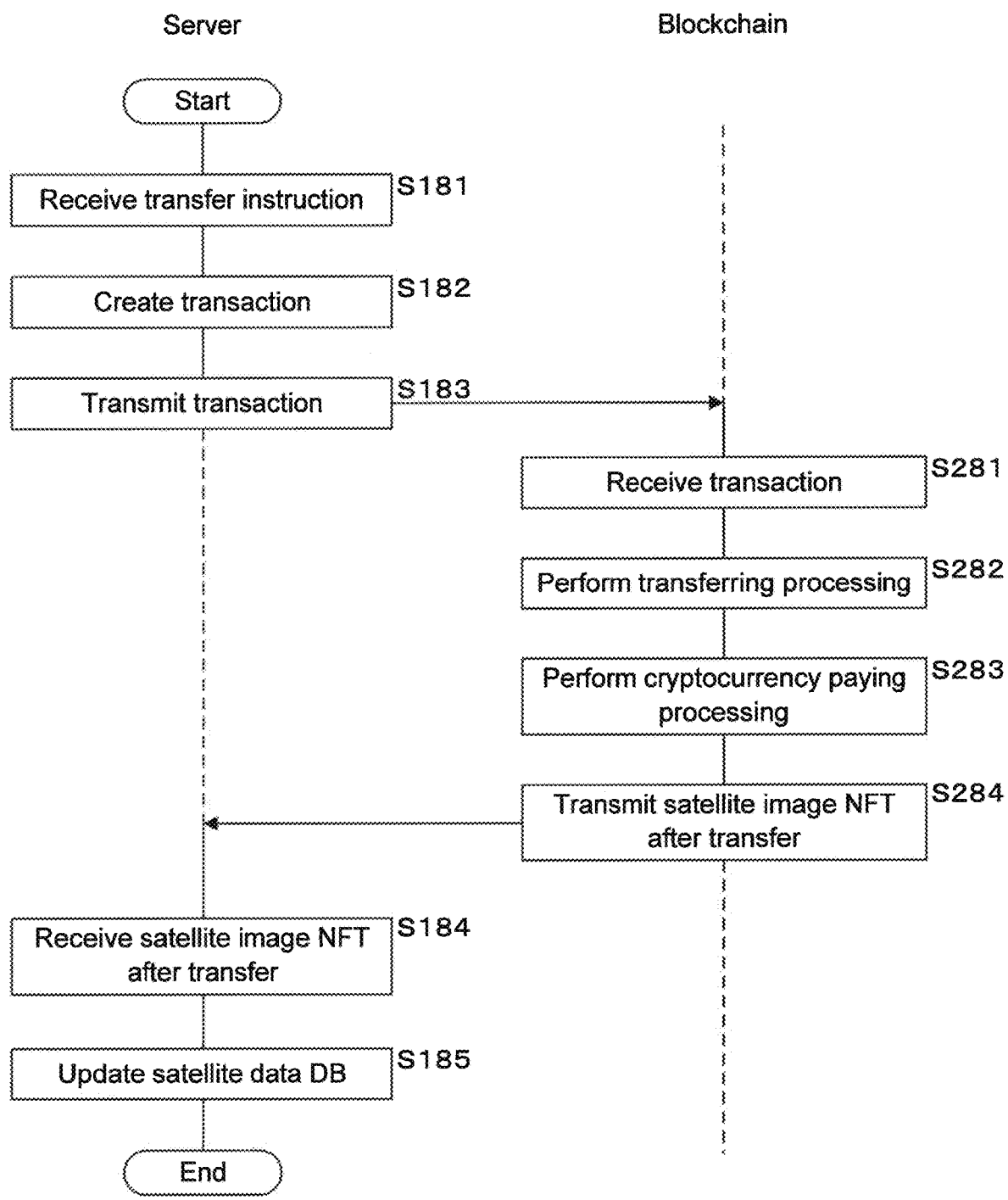
FIG. 21 is a flowchart showing a processing procedure when paying cryptocurrency to an administrator.

FIG. 21 is a flowchart showing a processing procedure when paying cryptocurrency to the administrator. The control unit 11 of the server 1 receives an instruction to transfer the satellite image NFT through the communication unit 13 or the input unit 14 (step S181). In response to the received transfer instruction, the control unit 11 creates a transaction for transferring the satellite image NFT (step S182). The transaction includes the token ID of the satellite image NFT, the transferor's owner address, the transferee's owner address, the transaction date and time, and the like.

The control unit 11 transmits the created transaction to one of the nodes 21 of the blockchain 2 through the communication unit 13 (step S183). The control unit 211 of the node 21 of the blockchain 2 receives the transaction transmitted from the server 1 through the communication unit 213 (step S281).

The control unit 211 performs processing for transferring the target satellite image NFT in response to the received transaction (step S282). Specifically, the control unit 211 takes over the token ID and the token URI of the satellite image NFT. The control unit 211 changes the owner address of the satellite image NFT from the owner address of the transferor to the owner address of the transferee. The control unit 211 records the token ID, owner address (transferee), token URI, and the like of the satellite image NFT after transfer in the storage unit 212.

The control unit 211 performs processing for paying cryptocurrency to the administrator using a smart contract for making a payment to the administrator that is recorded in advance in the storage unit 212 (step S283). The control unit 211 transmits the satellite image NFT after transfer to the server 1 through the communication unit 213 (step S284).

The control unit 11 of the server 1 receives the satellite image NFT after transfer, which is transmitted from the node 21, through the communication unit 13 (step S184). The control unit 11 updates the satellite image NFT after transfer in the satellite data DB 171 of the mass storage unit 17 based on the satellite image ID (step S185), and ends the process.

According to the present embodiment, it is possible to issue the satellite image NFT corresponding to the satellite image on the blockchain 2.

According to the present embodiment, it is possible to display a satellite image corresponding to the satellite image NFT or behavior data of the satellite 4 that captured the satellite image.

According to the present embodiment, it is possible to pay cryptocurrency to the administrator who manages the satellite image corresponding to the satellite image NFT with the transfer of the satellite image NFT.

EMBODIMENT 4

Embodiment 4 relates to a form in which anti-tampering processing is performed on data obtained by combining different types of satellite data. In addition, the description of the same contents as in Embodiments 1 to 3 will be omitted.

FIG. 22 is an explanatory diagram showing an example of the record layout of the satellite data DB 171 in Embodiment 4. The satellite data DB 171 includes a satellite data ID column, a satellite image column, a behavior data column, a command data column, an observation data column, a hash value column, a satellite ID column, a combination data NFT column, and a serial number column. The satellite data ID column stores a satellite data ID for identifying satellite data.

The satellite image column stores time-series satellite images captured by the satellite 4 within a predetermined period (for example, 60 seconds). The satellite image column includes an image ID column, a date and time column, and an image data column.

The image ID column stores a satellite image ID for identifying a satellite image captured by the satellite 4. The date and time column stores information about the date and time when the satellite image is captured. The image data column stores satellite image data. The behavior data column stores behavior data of the satellite 4 in association with image data of the satellite image. The behavior data includes the imaging position, posture at the time of imaging, orbit data of the satellite 4, and the like.

The command data column stores command data of the satellite 4 in association with the image data of the satellite image. The command data includes a command for controlling the orbit, altitude, posture, temperature, and the like of the satellite 4, the execution time when the satellite 4 executed the command, and the like. The command data may be command data associated with all of the time-series satellite images captured by the satellite 4 within a predetermined period, or may be command data associated with the satellite image at the time of each imaging.

The observation data column stores observation data (for example, meteorological data or carbon dioxide concentration data) obtained by observing the earth or outer space using a sensor or the like mounted on the satellite 4. In addition, the observation data is associated with image data, behavior data, and command data of the satellite image.

The hash value column stores hash values of all of the satellite image, behavior data when the satellite image is captured, command data when the satellite image is captured, and observation data obtained by analyzing the satellite image or hash values of combination data obtained by combining at least two of these. The combination data may be, for example, data obtained by combining a satellite image and behavior data, data obtained by combining a satellite image and command data, data obtained by combining a satellite image and observation data, data obtained by combining behavior data and command data, data obtained by combining behavior data and observation data, or data obtained by combining command data and observation data.

In addition, the combination data may be data obtained by combining a satellite image, behavior data, and command data, data obtained by combining a satellite image, command data, and observation data, data obtained by combining behavior data, command data, and observation data, or data obtained by combining a satellite image, behavior data, command data, and observation data.

In addition, the present invention is not limited to the types of combination data described above. For example, any of the different types of satellite data or combination data of satellite data may be further combined. Alternatively, a processed satellite image obtained by performing machine learning processing on a satellite image may be combined with different types of satellite data.

The combination data NFT column stores a combination data NFT issued on the blockchain 2. In addition, since the configuration of the combination data NFT is similar to that of the satellite image NFT in Embodiment 3, the description thereof will be omitted. The serial number column stores a serial number for the upper limit number in the combination data NFT. The serial number is a series of unique numbers assigned to identify the combination data NFT.

Hereinafter, an example of combination data obtained by combining a satellite image, behavior data, and command data will be described. However, the present invention can be similarly applied to other types of data.

Figure 23:
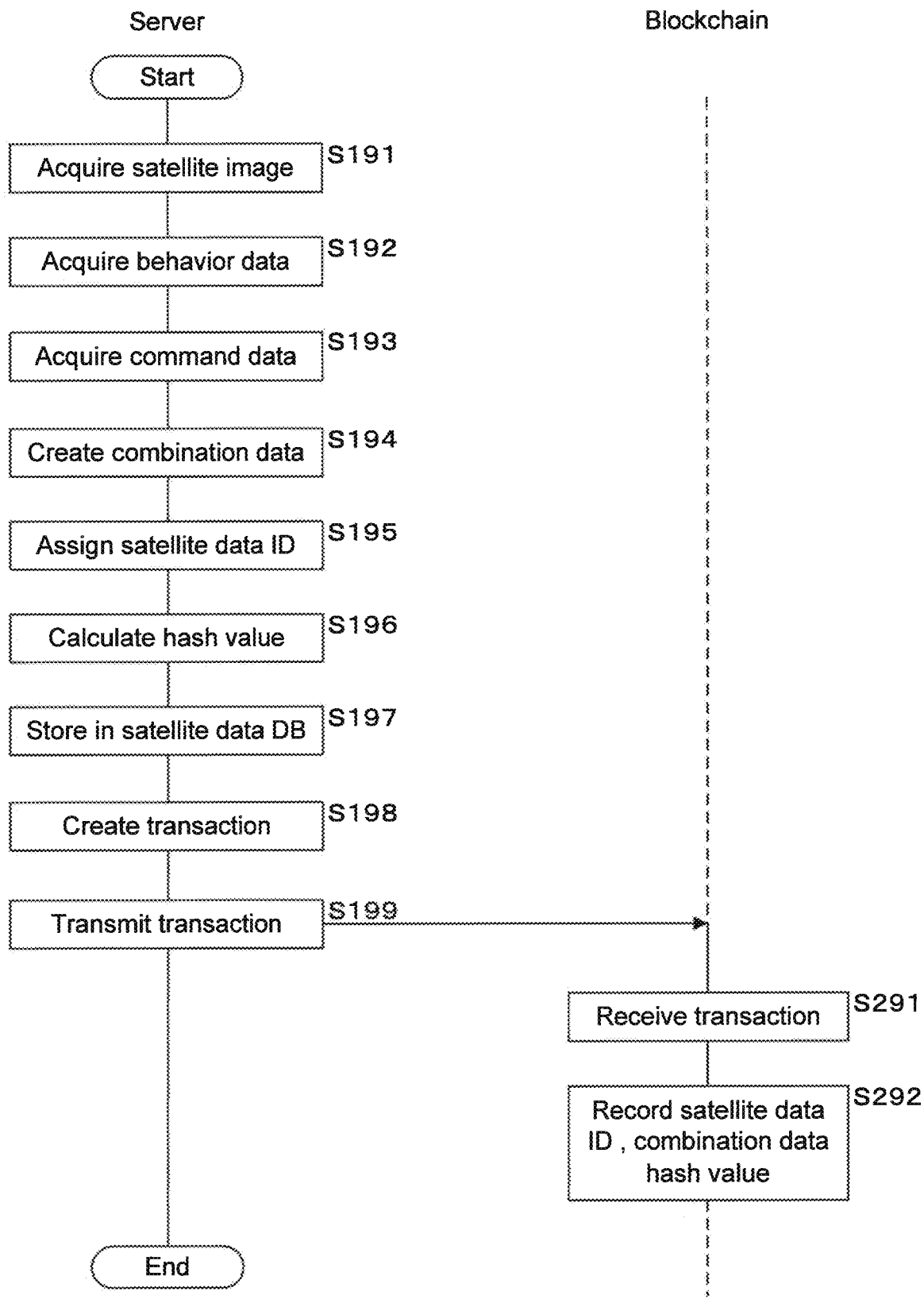
FIG. 23 is a flowchart showing a processing procedure when performing anti-tampering processing on combination data.

FIG. 23 is a flowchart showing a processing procedure when performing anti-tampering processing on combination data. The control unit 11 of the server 1 acquires a satellite image as an anti-tampering target from the satellite 4 through the communication unit 13 (step S191). The control unit 11 acquires behavior data as an anti-tampering target from the satellite 4 through the communication unit 13 (step S192). The control unit 11 acquires command data as an anti-tampering target from the satellite 4 through the communication unit 13 (step S193). The control unit 11 creates combination data by combining the acquired satellite image, behavior data, and command data (step S194).

The control unit 11 assigns a satellite data ID to the created combination data (step S195). The control unit 11 calculates a hash value of the created combination data using a cryptographic hash function (step S196). The control unit 11 stores the satellite image (image ID, date and time, and image data), the behavior data, the command data, the calculated hash value of the combination data, and the satellite ID as one record in the satellite data DB 171 of the mass storage unit 17 in association with the assigned satellite data ID (step S197).

The control unit 11 creates a transaction for anti-tampering processing on the combination data (step S198). The created transaction includes the satellite data ID, the hash value of the combination data, and the like. The control unit 11 transmits the created transaction to one of the nodes 21 of the blockchain 2 through the communication unit 13 (step S199).

The control unit 211 of the node 21 of the blockchain 2 receives the transaction transmitted from the server 1 through the communication unit 213 (step S291). The control unit 211 records the satellite data ID and the hash value of the combination data included in the received transaction in the storage unit 212 (step S292).

In addition, it is possible to perform authentication processing on the combination data. Specifically, the user terminal 3 acquires the combination data as an authentication target. The user terminal 3 displays the acquired combination data on an authentication screen (not shown) for verifying the authenticity of the combination data. When an authentication request from the user is received through the authentication screen, the user terminal 3 transmits the received authentication request to the server 1. The authentication request includes a user ID, a satellite data ID of the combination data, and the combination data.

The server 1 calculates a hash value of the combination data included in the authentication request transmitted from the user terminal 3. Based on the satellite data ID included in the authentication request, the server 1 acquires the hash value of the combination data stored on the node 21 of the blockchain 2. The server 1 determines whether or not the calculated hash value of the combination data matches the stored hash value of the combination data.

When it is determined that the two hash values match, the server 1 determines that the combination data is true combination data and that the authentication is successful. Conversely, when it is determined that the two hash values do not match, the server 1 determines that the combination data is invalid combination data and the authentication has failed.

The server 1 transmits the authentication result and the authentication date and time for the combination data to the user terminal 3. The authentication result includes the satellite data ID, information indicating whether or not the authentication is successful, and the like. The user terminal 3 receives the authentication result and the authentication date and time transmitted from the server 1, and displays these on the screen.

In addition, although an example of hash value storage processing or authentication processing based on the hash value for the entire combination data has been described in the present embodiment, the present invention is not limited thereto. For example, the server 1 may calculate hash values of various types of data in the combination data, and record the calculated hash values in the node 21 of the blockchain 2.

When an authentication request for the combination data is received from the user terminal 3, the server 1 calculates the hash values of various types of data in the combination data. The server 1 acquires the hash values of various types of data in the combination data stored on the node 21 of the blockchain 2. The server 1 may determine whether or not the calculated hash values of various types of data in the combination data match the stored hash values of various types of data in the combination data by comparing these hash values.

In addition, the combination data NFT corresponding to the combination data can be generated on the blockchain 2. Specifically, the server 1 acquires combination data for which the combination data NFT is to be issued. For example, the combination data is data obtained by combining a satellite image, behavior data, and command data. The server 1 calculates a hash value of the acquired combination data using a cryptographic hash function. The server 1 determines whether or not the upper limit number of issuances (for example, 100) in the combination data NFT has been reached.

When it is determined that the upper limit number of issuances has not been reached, the server 1 transmits an instruction to issue the combination data NFT to one of the nodes 21 of the blockchain 2. The node 21 of the blockchain 2 receives the instruction to issue the combination data NFT transmitted from the server 1. In response to the received issuance instruction, the node 21 issues the combination data NFT on the blockchain 2. The node 21 records the token ID, the owner address and the token URI of the issued combination data NFT.

The node 21 transmits the issued combination data NFT to the server 1. The server 1 receives the combination data NFT transmitted from the node 21 of the blockchain 2. The server 1 assigns a serial number to the received combination data NFT. The server 1 stores the received combination data NFT and the assigned serial number in the satellite data DB 171 in association with the satellite data ID. According to the present embodiment, it is possible to perform anti-tampering processing on combination data obtained by combining different types of satellite data.

According to the present embodiment, it is possible to enhance security by performing a process to prevent tampering with the combination data.

According to the present embodiment, it is possible to perform authentication processing on the combination data and output the authentication result of the combination data.

According to the present embodiment, it is possible to issue a combination data NFT corresponding to the combination data on the blockchain 2.

In addition, the various processes performed on the server 1 in each of the above-described embodiments may be performed on an information processing apparatus and the like mounted on the satellite 4, which is a spacecraft including an artificial satellite, a space probe, a space plane, a UAS, a UAF, and the like. In addition, the various processes described above may be performed in a distributed manner on a plurality of information processing apparatuses and the like mounted on a plurality of satellites 4.

It should be considered that the embodiments disclosed are examples in all points and not restrictive. The scope of the present invention is defined by the claims rather than the meanings set forth above, and is intended to include all modifications within the scope and meaning equivalent to the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An information processing method, comprising:
   acquiring satellite data regarding a satellite;
   performing anti-tampering processing on the acquired satellite data; and
   outputting satellite data obtained after the anti-tampering processing on the satellite data;
   wherein a satellite image captured by the satellite is acquired as the satellite data, anti-tampering processing on the acquired satellite image is performed, and a satellite image obtained after the anti-tampering processing on the satellite image is output;
   wherein, when an authentication request for the satellite image is received, authentication processing is performed on the satellite image and an authentication result of the authentication processing is output; and
   wherein a hash value of a satellite image as an authentication target is calculated and it is determined whether or not the calculated hash value of the satellite image as an authentication target matches a hash value of a satellite image stored on a blockchain system that corresponds to the satellite image as an authentication target.

2. The information processing method according to claim 1, wherein a processed satellite image is acquired by performing machine learning processing on the satellite image, anti-tampering processing on the acquired satellite image is performed, and
   a satellite image obtained after the anti-tampering processing on the satellite image is output.

3. The information processing method according to claim 1, wherein a hash value of the satellite image is calculated, and
   the calculated hash value of the satellite image is stored in a storage unit.

4. The information processing method according to claim 1, wherein a hash value of the satellite image is calculated, and
   the calculated hash value of the satellite image is output to a blockchain system.

5. The information processing method according to claim 1, wherein a hash value of a satellite image as an authentication target is calculated, and
it is determined whether or not the calculated hash value of the satellite image as an authentication target matches a hash value of a satellite image stored in a storage unit that corresponds to the satellite image as an authentication target.

6. The information processing method according to claim 1, wherein a satellite image NFT corresponding to the satellite image is generated on a blockchain system.

7. The information processing method according to claim 6, wherein an issuance limit for the satellite image NFT is set to issue the satellite image NFT, and
a serial number for an upper limit number for the satellite image NFT is stored.

8. The information processing method according to claim 6, wherein a smart contract is stored on the blockchain system to make a payment to an administrator who manages a satellite image corresponding to the satellite image NFT with transfer of the satellite image NFT.

9. The information processing method according to claim 1, wherein the satellite data further includes behavior data of the satellite,
anti-tampering processing on the behavior data is performed, and
behavior data obtained after the anti-tampering processing on the behavior data is output.

10. The information processing method according to claim 9, wherein the behavior data includes an imaging time, an imaging position, a posture at time of imaging, or orbit data of a satellite.

11. The information processing method according to claim 9, wherein a hash value of the behavior data is calculated, and
the calculated hash value of the behavior data is output to a blockchain system.

12. The information processing method according to claim 9, wherein, when an authentication request for the behavior data is received, authentication processing is performed on the behavior data, and
an authentication result of the authentication processing is output.

13. The information processing method according to claim 1, wherein the satellite data further includes observation data of the satellite,
anti-tampering processing on the observation data is performed, and
observation data obtained after the anti-tampering processing on the observation data is output.

14. The information processing method according to claim 13, wherein, when an authentication request for the observation data is received, authentication processing is performed on the observation data, and
an authentication result of the authentication processing is output.

15. The information processing method according to claim 1, wherein the satellite data further includes command data of the satellite,
anti-tampering processing on the command data is performed, and
command data obtained after the anti-tampering processing on the command data is output.

16. An information processing apparatus, comprising:
a control unit,
wherein the control unit acquires satellite data regarding a satellite, performs anti-tampering processing on the acquired satellite data, and outputs satellite data obtained after the anti-tampering processing on the satellite data,
wherein a satellite image captured by the satellite is acquired as the satellite data, anti-tampering processing on the acquired satellite image is performed, and a satellite image obtained after the anti-tampering processing on the satellite image is output;
wherein, when an authentication request for the satellite image is received, authentication processing is performed on the satellite image and an authentication result of the authentication processing is output; and
wherein a hash value of a satellite image as an authentication target is calculated and it is determined whether or not the calculated hash value of the satellite image as an authentication target matches a hash value of a satellite image stored on a blockchain system that corresponds to the satellite image as an authentication target.

17. A non-transitory computer-readable recording medium with a program recorded causing a computer to execute processing of:
acquiring satellite data regarding a satellite;
performing anti-tampering processing on the acquired satellite data; and
outputting satellite data obtained after the anti-tampering processing on the satellite data;
wherein a satellite image captured by the satellite is acquired as the satellite data, anti-tampering processing on the acquired satellite image is performed, and a satellite image obtained after the anti-tampering processing on the satellite image is output;
wherein, when an authentication request for the satellite image is received, authentication processing is performed on the satellite image and an authentication result of the authentication processing is output; and
wherein a hash value of a satellite image as an authentication target is calculated and it is determined whether or not the calculated hash value of the satellite image as an authentication target matches a hash value of a satellite image stored on a blockchain system that corresponds to the satellite image as an authentication target.

18. An information processing method, comprising:
acquiring satellite data regarding a satellite;
performing anti-tampering processing on the acquired satellite data; and
outputting satellite data obtained after the anti-tampering processing on the satellite data;
wherein a satellite image captured by the satellite is acquired as the satellite data, anti-tampering processing on the acquired satellite image is performed, and a satellite image obtained after the anti-tampering processing on the satellite image is output;
wherein a satellite image NFT corresponding to the satellite image is generated on a blockchain system; and
wherein an issuance limit for the satellite image NFT is set to issue the satellite image NFT and a serial number for an upper limit number for the satellite image NFT is stored.

19. An information processing method, comprising:
acquiring satellite data regarding a satellite;
performing anti-tampering processing on the acquired satellite data; and
outputting satellite data obtained after the anti-tampering processing on the satellite data;

wherein a satellite image captured by the satellite is acquired as the satellite data, anti-tampering processing on the acquired satellite image is performed, and a satellite image obtained after the anti-tampering processing on the satellite image is output;

wherein a satellite image NFT corresponding to the satellite image is generated on a blockchain system; and wherein a smart contract is stored on the blockchain system to make a payment to an administrator who manages a satellite image corresponding to the satellite image NFT with transfer of the satellite image NFT.

\* \* \* \* \*